(12) United States Patent
Lin et al.

(10) Patent No.: US 11,740,336 B2
(45) Date of Patent: Aug. 29, 2023

(54) COHERENT LIDAR SYSTEM INCLUDING OPTICAL ANTENNA ARRAY

(71) Applicant: OURS Technology, LLC, Mountain View, CA (US)

(72) Inventors: Sen Lin, Santa Clara, CA (US); Andrew Steil Michaels, Santa Clara, CA (US)

(73) Assignee: OURS TECHNOLOGY, LLC, Mountain View, CA (US)

( * ) Notice: Subject to any disclaimer, the term of this patent is extended or adjusted under 35 U.S.C. 154(b) by 0 days.

(21) Appl. No.: 17/558,476

(22) Filed: Dec. 21, 2021

(65) Prior Publication Data

US 2022/0196814 A1 Jun. 23, 2022

Related U.S. Application Data

(60) Provisional application No. 63/129,847, filed on Dec. 23, 2020.

(51) Int. Cl.
*G01S 7/4911* (2020.01)
*G01S 17/931* (2020.01)
*G01S 17/42* (2006.01)
*G01S 7/4914* (2020.01)

(52) U.S. Cl.
CPC .......... *G01S 7/4911* (2013.01); *G01S 7/4914* (2013.01); *G01S 17/42* (2013.01); *G01S 17/931* (2020.01)

(58) Field of Classification Search
CPC ...... G01S 7/4911; G01S 7/4914; G01S 17/42; G01S 17/931
See application file for complete search history.

(56) References Cited

U.S. PATENT DOCUMENTS

| | | | |
|---|---|---|---|
| 8,988,754 B2 | 3/2015 | Sun et al. | |
| 9,476,981 B2 | 10/2016 | Yaacobi et al. | |
| 10,008,772 B2 * | 6/2018 | Mayo | H01Q 1/3275 |
| 10,338,321 B2 | 7/2019 | Hosseini et al. | |

(Continued)

FOREIGN PATENT DOCUMENTS

| | | | | |
|---|---|---|---|---|
| WO | 2017223299 A1 | 12/2017 | | |
| WO | WO-2019217860 A1 * | 11/2019 | ............. | G01S 17/34 |
| WO | 2020205450 A1 | 10/2020 | | |

OTHER PUBLICATIONS

International Searching Authority, Patent Cooperation Treaty, International Application No. PCT/US2021/065133, Notification Date: Mar. 25, 2022, 4 pages.

(Continued)

*Primary Examiner* — Yuqing Xiao
*Assistant Examiner* — Jempson Noel
(74) *Attorney, Agent, or Firm* — Dority & Manning, P.A.

(57) ABSTRACT

A light detection and ranging (LIDAR) transceiver includes optical antenna arrays and an optical switch. Some of the optical antenna arrays include a number of optical antennas and an optical splitter coupled to the optical antennas. The optical splitter may include a number of passive optical splitters. The optical splitter provides a portion of an input signal to the optical antennas. The optical switch is configured to selectively provide the input signal to at least one of the plurality of optical antenna arrays. The optical switch enables addressable field of view scanning by selectively providing the input signal to the plurality of antenna arrays, one array at a time.

20 Claims, 15 Drawing Sheets

(56) References Cited

U.S. PATENT DOCUMENTS

| | | | |
|---|---|---|---|
| 10,627,517 B2 | 4/2020 | Yaacobi et al. | |
| 10,761,272 B2 | 9/2020 | Hosseini et al. | |
| 11,150,411 B2 | 10/2021 | Hosseini et al. | |
| 11,243,296 B2* | 2/2022 | Byrd | G01S 7/4863 |
| 11,372,106 B2 | 6/2022 | Yaacobi et al. | |
| 2014/0376001 A1* | 12/2014 | Swanson | G01N 21/17 |
| | | | 356/479 |
| 2018/0172806 A1* | 6/2018 | Marron | G01S 7/4865 |
| 2018/0267250 A1* | 9/2018 | Hosseini | G01S 17/42 |
| 2019/0391243 A1* | 12/2019 | Nicolaescu | G01S 7/4911 |
| 2020/0209361 A1 | 7/2020 | Maier et al. | |
| 2022/0003842 A1* | 1/2022 | Wang | G01S 7/4816 |
| 2022/0003937 A1 | 1/2022 | Hosseini et al. | |
| 2022/0050201 A1* | 2/2022 | Sun | G01S 7/4817 |

OTHER PUBLICATIONS

International Searching Authority, Patent Cooperation Treaty, Written Opinion of the International Searching Authority, International Application No. PCT/US2021/065133, Notification Date: Mar. 25, 2022, 5 pages.

* cited by examiner

COHERENT LIDAR SYSTEM INCLUDING OPTICAL ANTENNA ARRAY

CROSS-REFERENCE TO RELATED APPLICATIONS

This application claims priority to U.S. provisional Application No. 63/129,847 filed Dec. 23, 2020, which is hereby incorporated by reference.

TECHNICAL FIELD

This disclosure relates generally to coherent light detection and ranging (LIDAR) and, more particularly, to an optical antenna architecture for coherent LIDAR.

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more LIDAR devices for sensing its environment.

BRIEF SUMMARY OF THE INVENTION

Implementations the disclosure include a transceiver for a light detection and ranging (LIDAR) sensor system. The transceiver includes a plurality of optical antenna arrays and an optical switch. At least two of the plurality of optical antenna arrays include a plurality of optical antennas and an optical splitter coupled to the plurality of optical antennas. The optical switch is coupled to the plurality of optical antenna arrays. The optical switch is configured to selectively provide an input signal to at least one of the plurality of optical antenna arrays.

In an implementation, the input signal is a modulated laser signal. The optical switch includes an active optical splitter that selectively couples the modulated laser signal to only one of the plurality of optical antenna arrays.

In an implementation, the input signal is a frequency modulated continuous wave (FMCW) laser signal. The optical switch includes an active optical splitter that selectively couples the FMCW laser signal to only one of the plurality of optical antenna arrays.

In an implementation, the optical switch optically couples the input signal to at least one of plurality of optical antenna arrays one-at-a-time over a scanning period of the transceiver.

In an implementation, the optical splitter includes a plurality of passive optical splitters configured to split a portion of the input signal between the plurality of optical antennas in a selected one of the plurality of optical antenna arrays.

In an implementation, the optical splitter is configured to enable concurrent transmission of the input signal from the plurality of optical antennas.

In an implementation, the plurality of optical antennas are arranged in a one-dimensional pattern or in a two-dimensional pattern.

In an implementation, at least one of the plurality of optical antenna arrays includes an optical pixel. The optical pixel includes at least one of the plurality of optical antennas and an optical combiner. The optical combiner is coupled to the at least one of the plurality of optical antennas. The optical combiner is configured to receive a local oscillator signal and receive a return LIDAR signal from the at least one of the plurality of optical antennas. The optical combiner is configured to provide a combined output signal.

In an implementation, the optical pixel further includes a plurality of photo diodes configured to convert the combined output signal into electrical signals representative of a LIDAR beat tone.

In an implementation, the transceiver for the LIDAR sensor system of claim 1 further includes a local oscillator configured to provide a plurality of local oscillator signals to the plurality of optical antenna arrays.

In an implementation, the local oscillator includes a plurality of optical splitters configured to provide the plurality of oscillator signals to the plurality of optical antenna arrays and includes a second optical switch coupled to the plurality of optical splitters and configured to selectively provide a portion of the input signal to at least one of the plurality of optical splitters.

In an implementation, at least one of the plurality of optical splitters includes a plurality of passive optical splitters configured to split a portion of the input signal between the plurality of optical antennas in a selected one of the plurality of optical antenna arrays.

In an implementation, the at least two of the plurality of optical antenna arrays include an output signal bus. The plurality of optical antennas of a first of the plurality of optical antenna arrays shares the output signal bus with a second of the plurality of optical antenna arrays.

In an implementation, the output signal bus includes electrical signal lines for an in-phase signal and a quadrature signal from each of the plurality of optical antennas.

Implementations of the disclosure include a light detection and ranging (LIDAR) sensor system. The LIDAR sensor system includes a light source and a transceiver. The light source is configured to generate an input signal. The transceiver is coupled to the light source to receive the input signal. The transceiver includes a plurality of optical antenna arrays and an optical switch. At least two of the plurality of optical antenna arrays include a plurality of optical antennas and an optical splitter coupled to the plurality of optical antennas. The optical switch is coupled to the plurality of optical antenna arrays. The optical switch is configured to selectively provide the input signal to at least one of the plurality of optical antenna arrays.

In an implementation, the LIDAR sensor system further includes a lens. The transceiver is optically coupled to the lens to provide solid-state scanning of blocks of a field of view of the lens.

In an implementation, the LIDAR sensor system further includes a processing engine configured to receive LIDAR return signals from the transceiver and configured to generate frames of LIDAR data based on the LIDAR return signals.

Implementations of the disclosure include an autonomous vehicle. The autonomous vehicle includes a light detection and ranging (LIDAR) sensor. The LIDAR sensor includes a light source that is configured to generate an input signal and a transceiver. The transceiver is coupled to the light source to receive the input signal. The transceiver includes a plurality of optical antenna arrays and an optical switch. At least two of the plurality of optical antenna arrays include a plurality of optical antennas and an optical splitter coupled to the plurality of optical antennas. The optical switch is coupled to the plurality of optical antenna arrays. The optical switch is configured to selectively provide the input signal to at least one of the plurality of optical antenna arrays.

In an implementation, the autonomous vehicle further includes a lens. The transceiver is optically coupled to the lens to provide horizon scanning of blocks of an operational environment of the autonomous vehicle.

In an implementation, the autonomous vehicle further includes a processing engine configured to receive LIDAR return signals from the transceiver and configured to generate a point cloud representation of an operational environment of the autonomous vehicle at least partially based on the LIDAR return signals.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1:
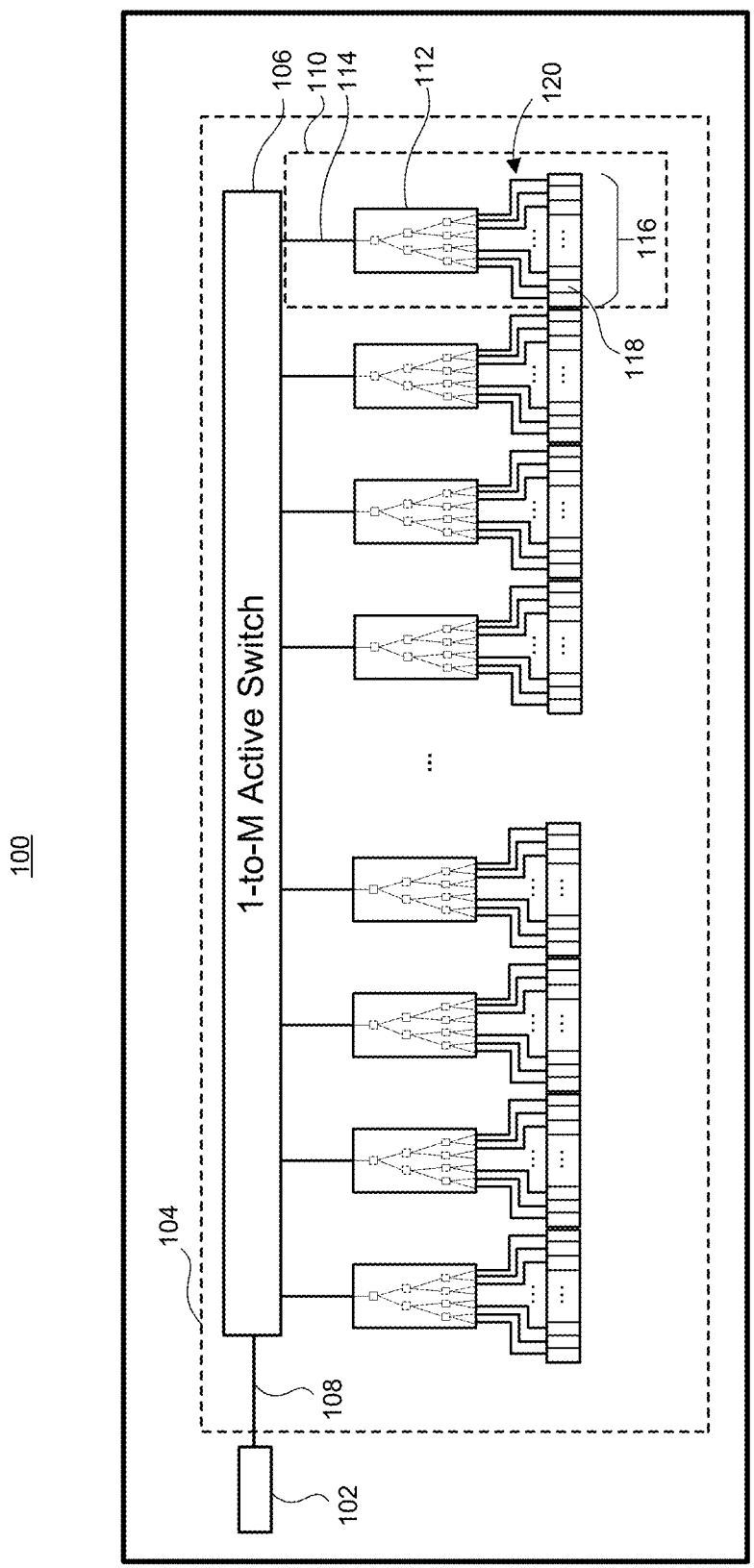
FIG. 1 illustrates a diagram of a chip for a LIDAR sensor, in accordance with implementations of the disclosure.

Embodiments of a coherent light detection and ranging (LIDAR) system are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

Discussed herein is a scalable and switchable optical antenna array architecture that, when combined with a lens, forms a real-time addressable focal plane array for solid-state beam steering in a coherent LIDAR system.

Conventional LIDAR systems rely on mechanical moving parts to steer the laser beam. As such, they can be bulky, costly and unreliable for many applications, such as automotive and robotics. The disclosed LIDAR system is a solid-state LIDAR system that overcomes these issues by eliminating or reducing mechanically moving parts used for steering the optical beam for LIDAR operation.

Coherent LIDAR systems include modulated, continuous wave (CW), and other types of LIDAR systems. Modulated LIDAR systems include frequency modulated continuous wave (FMCW) LIDAR systems and phase shift keying (PSK) systems, among others. Coherent LIDAR systems may directly measure range and velocity of an object by directing a frequency modulated or CW, collimated light beam at an object. The light that is reflected from the object is combined with a tapped version of the beam. The frequency of the resulting beat tone is proportional to the distance of the object from the LIDAR system, once corrected for a doppler shift that may be based on a second measurement. The two measurements, which may or may not be performed at the same time, provide both range and velocity information.

A consideration in the design of solid-state beam steering technologies for LIDAR systems is the complexity of the control circuitry. Reducing the complexity has numerous advantages in terms of cost, reliability, and scalability.

Another consideration in the design of solid-state beam steering technologies is the scan pattern, which is the order in which a scene is illuminated by one or more lasers. If parallel optical channels (e.g., of optical antennas) can be spatially-lumped together, then smaller contiguous blocks within the LIDAR system's full field of view can be dynamically addressed and adjusted as needed by the application. The ability to dynamically address blocks or portions of a field of view may advantageously reduce artifacts that can appear in point clouds generated from a scan. Additionally, concurrent operation of groups of adjacently/closely positioned optical antennas can occur with low latency, which may provide improved resolution and improved object recognition over conventional scanning techniques.

The disclosed coherent LIDAR system may be a modulated (e.g., FMCW) LIDAR system, a CW LIDAR system, or another coherent LIDAR system that is configured to determine depth information (e.g., distance, velocity, acceleration, for one or more objects) for a field of view of the system. The coherent LIDAR system may include a switchable coherent pixel array (SCPA) on a LIDAR chip (e.g., a photonic integrated circuit). The LIDAR chip may include one or more transceivers. A transceiver may include optical antenna arrays and an optical switch. The optical antenna arrays include a group (sub-array) of optical antennas and an optical splitter coupled to the optical antennas. The optical splitter provides a portion of an input signal to each the optical antennas. The input signal may be an electrical signal, an electro-optical signal, or an optical signal. The optical switch is configured to selectively provide the input signal to at least one of the plurality of optical antenna arrays as part of a scanning operation. The optical switch enables addressable field of view scanning by selectively providing the input signal to the plurality of antenna arrays, one array at a time. Each optical antenna may be part of a coherent pixel that includes the optical antenna, an optical combiner, an optical splitter, and/or photo-diodes. Accordingly, a sub-array or group of coherent pixels may include a sub-array or group of optical antennas.

The coherent LIDAR system may be configured steer the light (e.g., optical beams, laser beams) emitted from the LIDAR system in at least one dimension. In some implementations, the optical antennas are arranged in two-dimensions such that the LIDAR system can steer the light in two-dimensions. The ability to steer the light without moving parts may reduce form factor, cost, and reliability issues found in many conventional mechanically driven LIDAR systems.

The apparatus and system for an optical antenna architecture for a coherent LIDAR transceiver in this disclosure enables an addressable field of view and scalable focal plane array in solid-state that may be used in, for example, autonomous vehicles. These and other embodiments are described in more detail in connection with FIGS. 1-10C.

FIG. 1 illustrates a diagram of a chip of a LIDAR sensor 100, according to implementations of the disclosure. LIDAR sensor 100 may be part of a coherent LIDAR system, such as a modulated LIDAR system, a CW LIDAR system, an FMCW LIDAR system, or another coherent LIDAR system, according to various implementations. LIDAR sensor 100 is a switchable coherent pixel array (SCPA) LIDAR sensor on a chip that includes optical antennas configured to concurrently scan a portion of a field of view of a LIDAR system, according to an implementation. LIDAR sensor 100 may be a photonic integrated circuit and may be configured to perform block scanning with a beam having a dense pitch. Advantageously, block scanning an environment may reduce artifacts that can appear in point clouds generated during scan operations. Additionally, concurrent operation of groups of adjacently/closely positioned optical antennas supports low latency operations that provide improved resolution and improved object recognition in a number of applications, such as autonomous vehicle operation.

LIDAR sensor 100 includes an input port 102 coupled to provide an input signal to a transceiver 104, according to an implementation. The input signal may be an electrical signal, an electro-optical signal, or an optical signal. The input signal may be a CW laser signal. The input signal may be a modulated laser signal. The input signal may be an FMCW laser signal. Transceiver 104 includes an optical switch 106 and a number of optical antenna arrays 110 configured to enable block scanning of an environment with a LIDAR system. Optical switch 106 receives the input signal from input port 102 through a communications channel 108 (e.g., a waveguide). Optical switch 106 selectively distributes at least a portion of the input signal to optical antenna arrays 110, one at a time. Optical switch 106 is an active switch that includes M number of output channels and may be implemented as a silicon nitride switch having high power handling capabilities, according to an implementation.

In one implementation, optical switch 106 routes the input signal from input port 102 to each of optical antenna arrays 110, one at a time during a scan operation (e.g., during each scan of a field of view). Each one of optical antenna arrays 110 is a block or group of components that route a portion of the input signal to a group (sub-array) of optical antennas for concurrent transmission of the input signal. The components of each of the optical antenna arrays 110 are also configured to receive a return LIDAR signal and convert the return LIDAR signal from an optical signal to one or more electrical signals.

As illustrated, transceiver 104 includes a number of optical antenna arrays 110 (for clarity, only one of the arrays is highlighted in a dashed-line box), according to an implementation. Each one of optical antenna arrays 110 includes an optical splitter 112 that is coupled to optical switch 106 through a communication channel 114 (e.g., waveguide). Each one of optical antenna arrays 110 includes a group (e.g., sub-array) of coherent pixels 116 that is comprised of several (e.g., 8, 50, 100, etc.) individual coherent pixels 118. Each one of individual coherent pixels 118 is spatially located near other individual coherent pixels 118 in a one-dimensional pattern (e.g., a line) or in a two-dimensional pattern (e.g., a rectangle, another shape, or in a non-uniform distribution).

Group of coherent pixels 116 is coupled to optical splitter 112 through a number of communication channels 120 (e.g., waveguides). Optical splitter 112 includes a network of passive optical splitters configured to evenly distribute the input signal from communication channel 114 to communications channels 120, according to an implementation.

In an implementation, optical switch 106 may select from M number of optical antenna arrays 110, and optical splitter 112 splits the input signal into N number of communication channels 120, where the number N corresponds to the number of individual coherent pixels 118 in group of coherent pixels 116. N is also the number of transmitter and receiver channels and hence N may also define the total number of concurrent (at approximately the same time) measurements that may be made by a group of coherent pixels 116. The aggregate of optical antenna arrays 110 can be placed under a lens to form a solid-state focal plane array. Because parallel channels are grouped spatially in this array, smaller blocks within the full field of view of the focal plane array can be illuminated, allowing for dynamic addressing of the full field of view.

An advantage of the architecture of transceiver 104 is that the use of optical switch 106 decreases the number of optical ports used for operation. A reduction in optical ports results in a simpler and smaller silicon footprint in the optical paths between input port 102 and the optical antennas (shown in FIGS. 2A-2D) of individual coherent pixels 118.

Although a single transceiver 104 is illustrated, LIDAR sensor 100 may include a number of transceivers 104 coupled to other optical ports or coupled to input port 102, according to various implementations.

FIGS. 2A-2D illustrate various implementations of coherent pixels (e.g., individual coherent pixel 118, shown in FIG. 1) that may be utilized in LIDAR sensor 100, in accordance with implementations of the disclosure. A coherent pixel may be configured to (1) split an input signal into a local oscillator signal and a transmit signal, (2) couple the transmit signal into free space, (3) couple a return signal back into the coherent pixel, and/or (4) mix the local oscillator signal and the return signal.

Figure 2A:
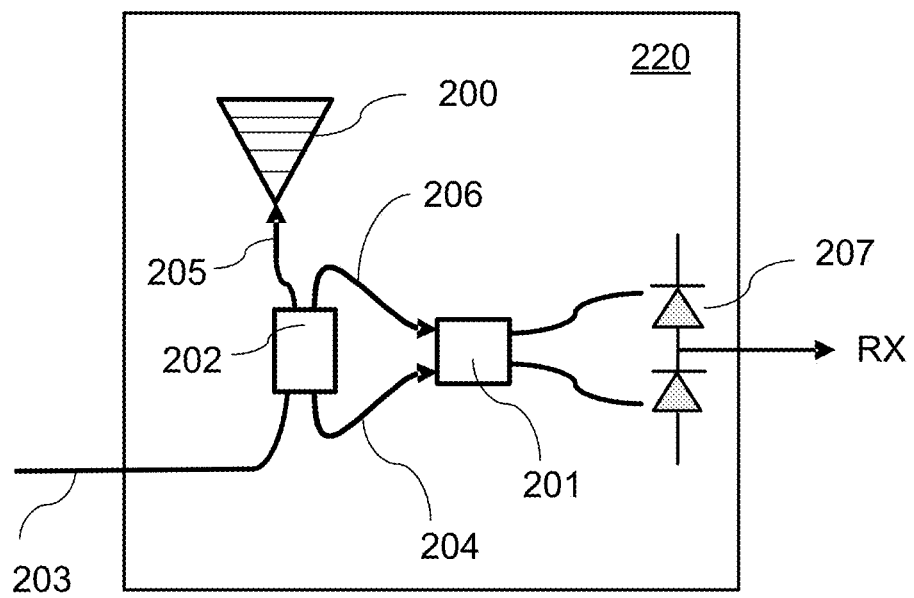
FIGS. 2A-2D illustrate various implementations of coherent pixels, in accordance with implementations of the disclosure.
Figure 2B:
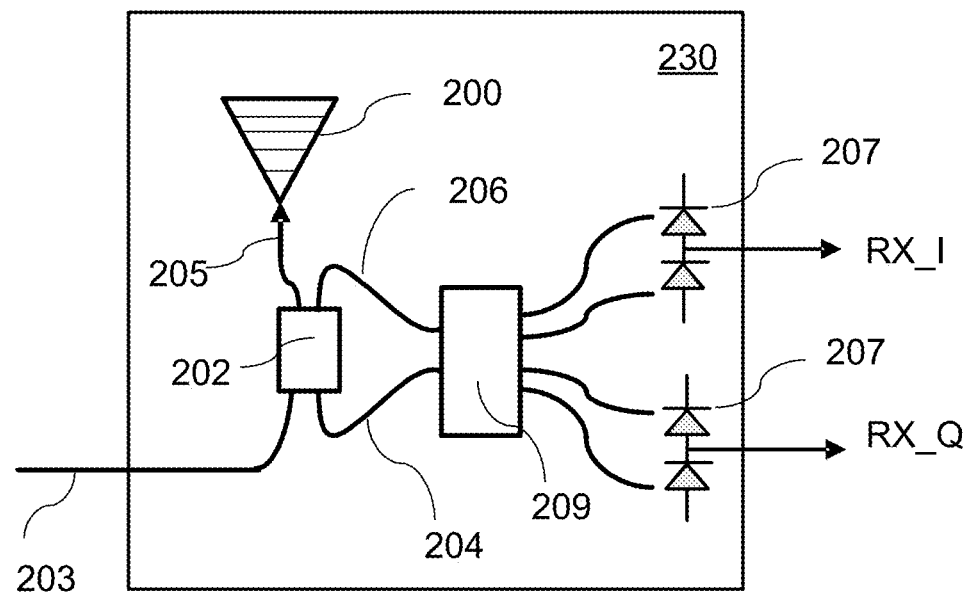

FIGS. 2A and 2B illustrate a coherent pixel 220 and a coherent pixel 230, in accordance with implementations of the disclosure. Coherent pixel 220 includes an optical antenna 200, an optical combiner 201, and an optical splitter 202. Coherent pixel 220 receives an optical signal (e.g., modulated laser signal, CW laser signal, FMCW laser signal, etc.) at an input port 203. Optical splitter 202 is coupled between input port 203 and optical antenna 200. Optical splitter 202 may be a bi-directional 2×2 optical splitter configured to split the input signal received on input port 203 into an antenna port 205 and a local oscillator port 206. Antenna port 205 is coupled to optical antenna 200. Antenna port 205 is configured to provide transmit signals to optical antenna 200 and is configured to receive return signals from optical antenna 200.

Optical antenna 200 is a device that emits light from on-chip waveguides into free space and/or couples light from free space into on-chip waveguides, according to an implementation. Optical antenna 200 may be implemented as a grating coupler, an edge coupler, an integrated reflector, or any spot-size converters. Optical antenna 200 may be polarization-sensitive with much higher emission/coupling efficiency for light with one particular polarization (e.g., transverse electric (TE) or transverse magnetic (TM)). Optical antenna 200 may be reciprocal and therefore may collect the return signal (e.g., a reflected beam) from an object under measurement (e.g., an object in an environment). Optical antenna 200 provides the return signal back to antenna port 205 of optical splitter 202. Optical splitter 202 may split the return signal between input port 203 and return signal port 204 or may be configured to provide the return signal only to return signal port 204. Optical splitter 202 may be configured as a "pseudo-circulator" where the transmitter and receiver are collocated.

Optical combiner 201 is configured to mix a local oscillator signal with the return signal. Optical combiner 201 mixes the return signal from return signal port 204 and the local oscillator signal from local oscillator port 206 for coherent detection. Optical combiner 201 is an optical mixer, which can be a balanced 2×2 optical mixer.

Coherent pixel 220 includes a photo-diode pair 207 that is configured to convert the optical signals into electrical signals for beat tone detection. Coherent pixel 220 may be referred to as a balanced photo-diode (BPD) coherent pixel.

Use of optical splitter 202 as the "pseudo-circulator" may eliminate having a discrete circulator for every single pixel, which is impractical for large-scale arrays with hundreds of pixels. Accordingly, implementation of coherent pixel 220 may reduce cost and form factor significantly. For example, the return signal may be divided between input port 203 and return signal port 204, of which the latter is used for coherent detection.

Coherent pixel 230 includes a hybrid optical combiner 209 and includes two photo-diode pairs 207 to convert the return signal and the local oscillator signal into electrical signals for beat tone detection, according to one implementation. Coherent pixel 230 uses hybrid optical combiner 209 to provide an in-phase output signal RX_I and a quadrature output signal RX_Q, according to an implementation. In-phase output signal RX_I and quadrature output signal RX_Q can be used to resolve velocity-distance ambiguities and/or enable advanced digital signal processing (DSP) algorithms in an FMCW LIDAR system.

Figure 2C:
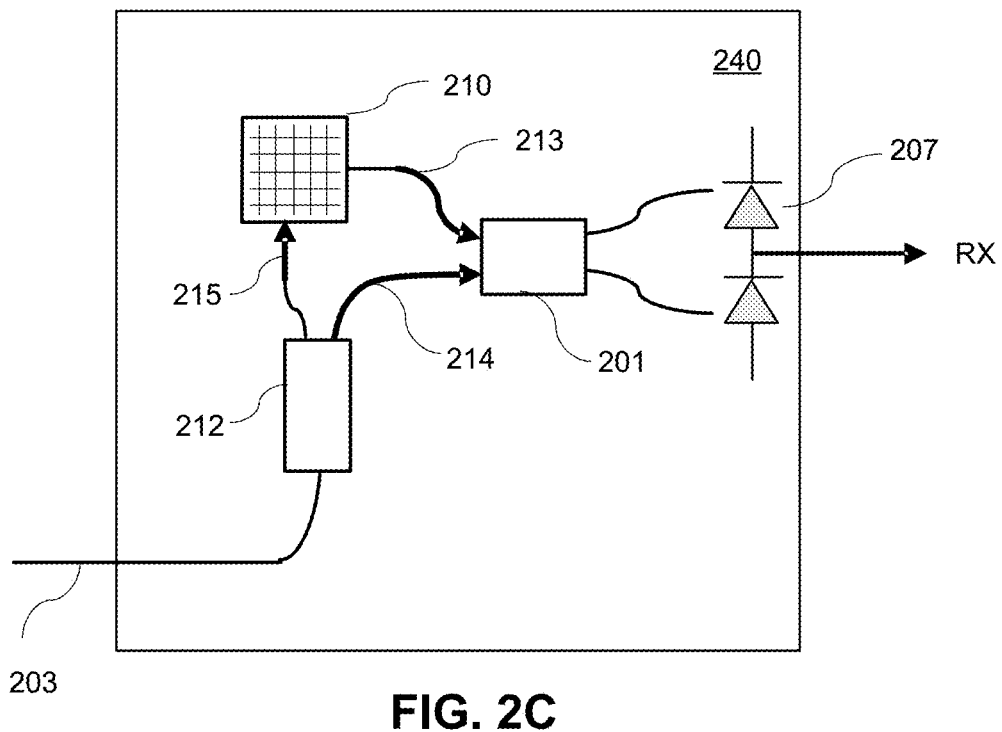
Figure 2D:
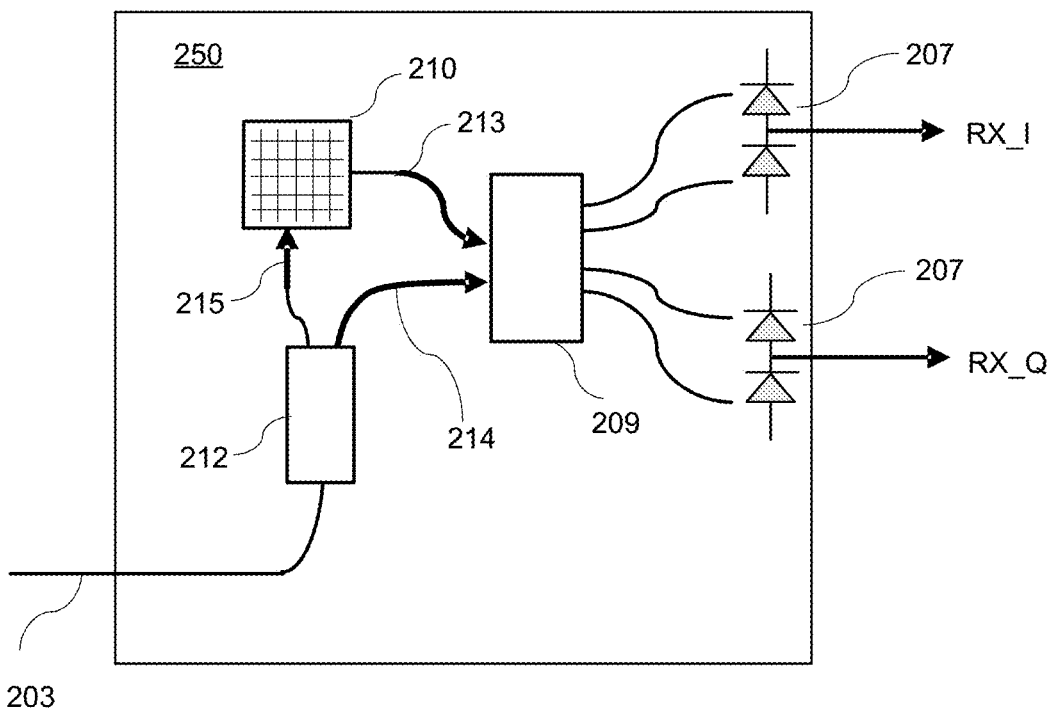

FIGS. 2C and 2D illustrate a coherent pixel 240 and a coherent pixel 250, in accordance with implementations of the disclosure. Coherent pixels 240 and 250 include polarization splitting antennas that may simplify optical splitter designs used in a coherent pixel.

Coherent pixel 240 includes an optical splitter 212, a polarization splitting antenna 210, optical combiner 201, and photo-diode pair 207, according to an implementation. An input signal is received at input port 203. Optical splitter 212 may include an input port coupled to input port 203, an antenna port 215, and a local oscillator port 214. A portion of the input signal that is routed to antenna port 215 is sent out of the chip directly using polarization splitting antenna 210 with one polarization (e.g., TM). Polarization splitting antenna 210 collects the return signal (reflected beam) from an object under measurement. Polarization splitting antenna 210 couples an orthogonal polarization (e.g., TE) into an antenna output port 213 (e.g., a waveguide) and sends the orthogonal polarization return signal directly to optical combiner 201. In this implementation, the return signal received by polarization splitting antenna 210 is not further divided by any additional splitters or a "pseudo-circulator."

Optical combiner 201 optically mixes the received return signal from antenna output port 213 with a portion of the optical signal from local oscillator port 214 for coherent detection. Photo-diode pair 207 convert the combined/mixed optical signals into electrical signals for beat tone detection.

Coherent pixel 250 includes hybrid optical combiner 209 and polarization splitting antenna 210, and two photo-diode pairs 207 convert the optical signals into in-phase output signal RX_I and quadrature output signal RX_Q, which are electrical signals that may be used for beat tone detection.

The designs of coherent pixels 240 and 250 realize an efficient integrated circulator for every single coherent pixel and may enable on-chip monostatic FMCW LIDAR with ultrahigh sensitivity.

Figure 3:
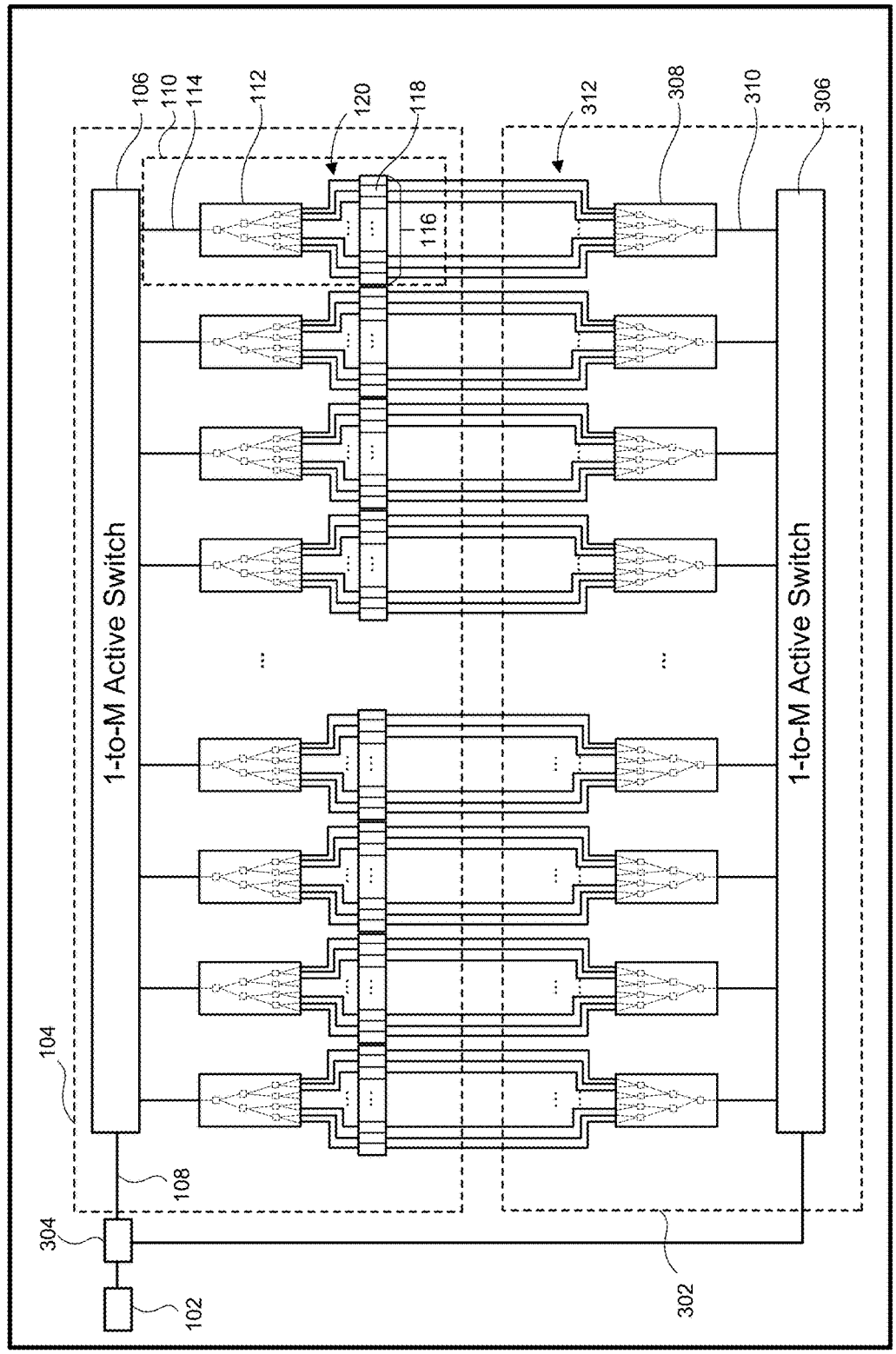
FIG. 3 illustrates a diagram of a chip for a LIDAR sensor, in accordance with implementations of the disclosure.

FIG. 3 illustrates a diagram of a chip of a LIDAR sensor 300 configured to selectively route a local oscillator signal to coherent pixels, in accordance with implementations of the disclosure. LIDAR sensor 300 may include many of the features of LIDAR sensor 100 (shown in FIG. 1). LIDAR sensor 300 reduces components from a coherent pixel by directly providing an external local oscillator signal, rather than having a coherent pixel split its own portion of the input signal received at input port 102. LIDAR sensor 300 is configured to provide a stronger local oscillator signal to coherent pixels than if a coherent pixel is configured to generate its own local oscillator signal.

LIDAR sensor 300 includes local oscillator network 302 that is coupled to an optical splitter 304 to receive a portion of an input signal as a local oscillator signal, according to an implementation. Local oscillator network 302 (e.g., a switch tree) includes an optical switch 306 that is configured to selectively provide the local oscillator signal to one of a number of optical splitters 308. Each of optical splitters 308 is coupled to optical switch 306 with a communication channel 310 (e.g., a waveguide). Optical splitters 308 are coupled to group of coherent pixels 116 through communication channels 312, according to an implementation. Optical switch 306 may be similar to optical switch 106 and may be configured to provide the local oscillator signal to a particular group of coherent pixels 116 at the same time that optical switch 106 provides the input signal to that particular group of coherent pixels 116. Optical splitters 308 may be similar to optical splitters 112 and may include a number of passive splitter components.

Figure 4A:
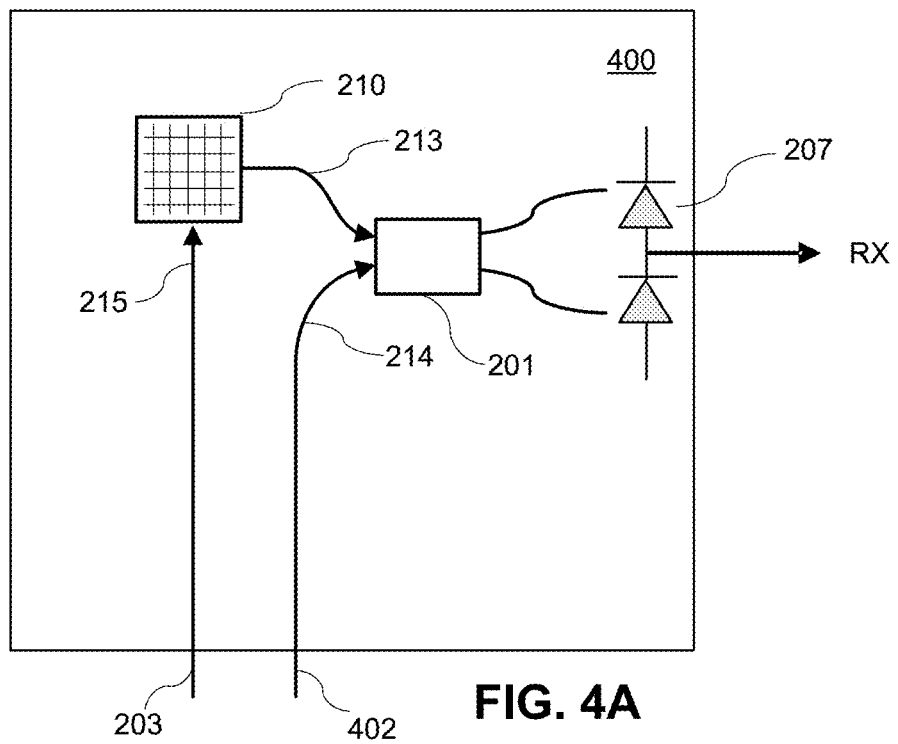
FIGS. 4A-4B illustrate various implementations of coherent pixels, in accordance with implementations of the disclosure.
Figure 4B:
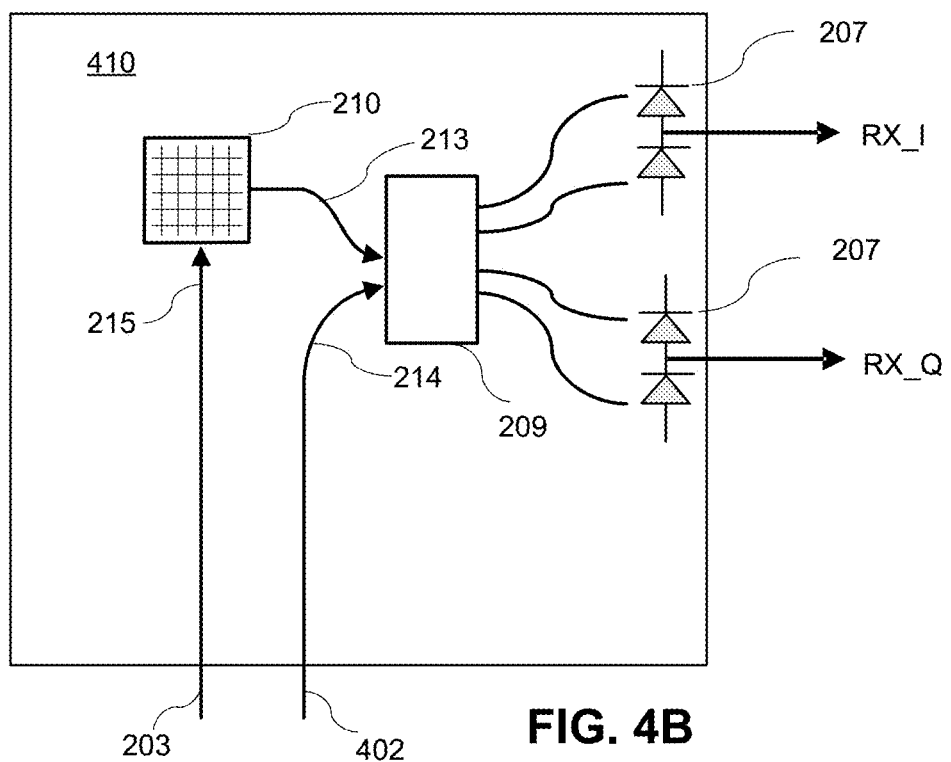

FIGS. 4A and 4B illustrate coherent pixels 400 and 410 that are configured to receive an external local oscillator signal, for example, from local oscillator network 302 (shown in FIG. 3), in accordance with implementations of the disclosure. Coherent pixels 400 and 410 are configured to receive the local oscillator signal at a local oscillator port 402. Coherent pixels 400 and 410 include similar features as coherent pixels 240 and 250 (shown in FIGS. 2C and 2D, respectively), according to an implementation.

Figure 5A:
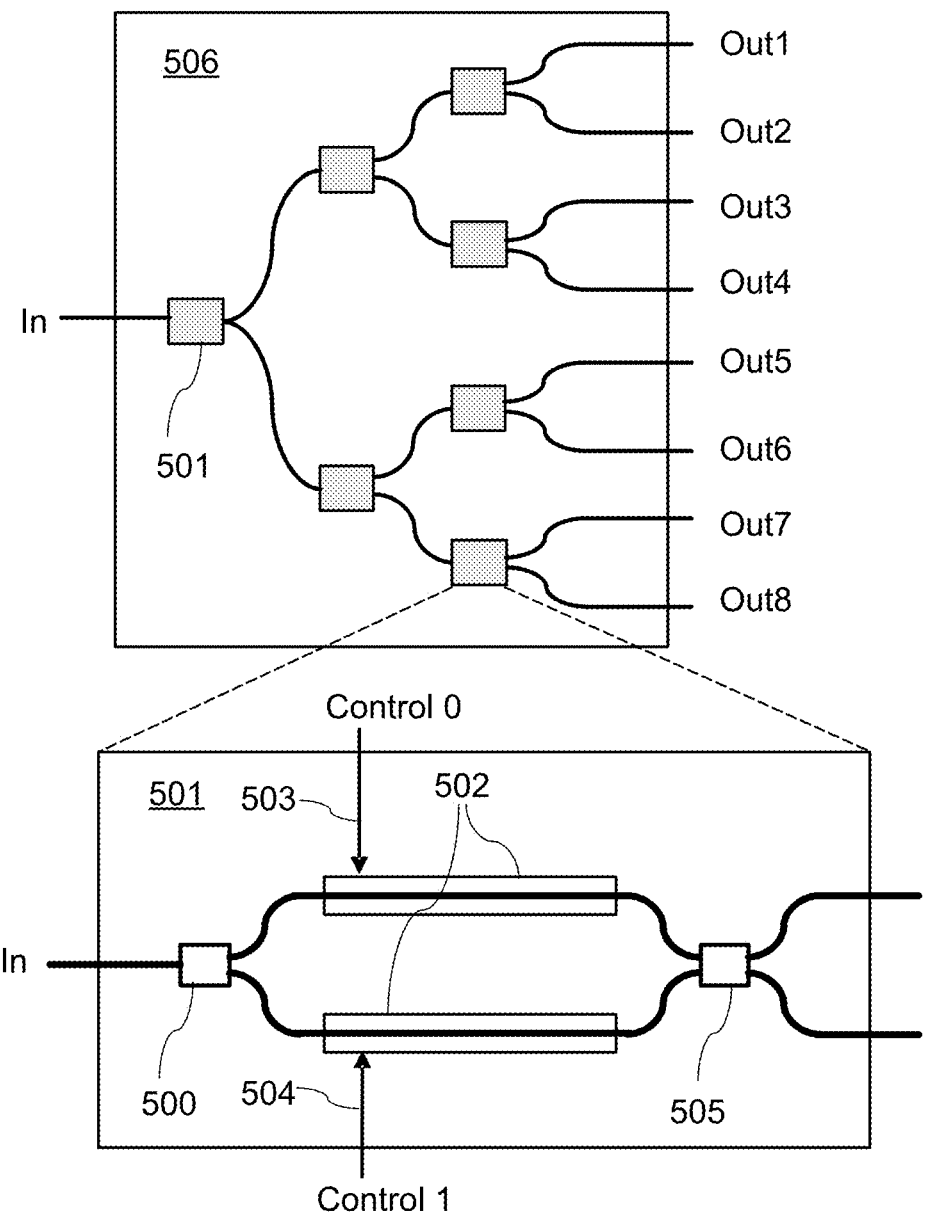
FIGS. 5A-5C illustrate various implementations of optical switches that may be used in a LIDAR system, in accordance with implementations of the disclosure.
Figure 5B:
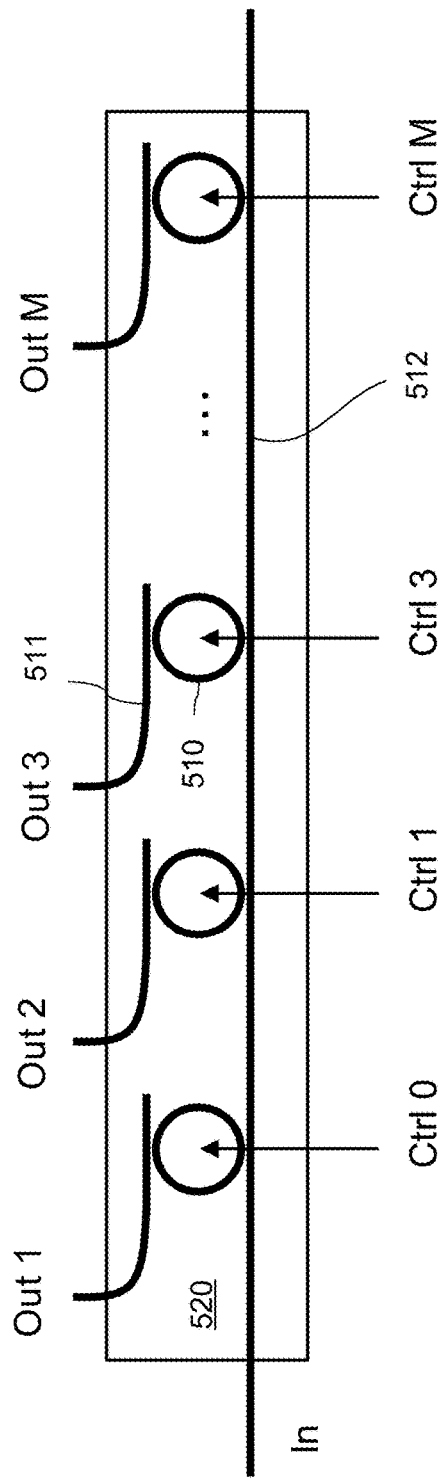
Figure 5C:
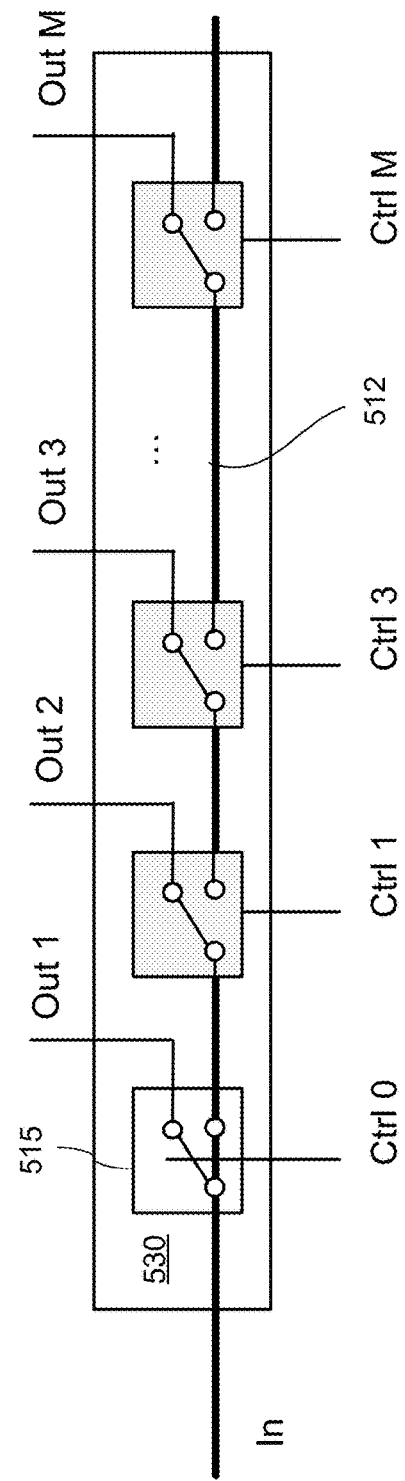

FIGS. 5A-5C illustrate various implementations of optical switches that may be used in any of the LIDAR systems of the disclosure. FIG. 5A illustrates an optical switch 506 that may be an implementation of optical switch 106 and/or optical switch 306. Optical switch 506 is a binary tree switch network having a number of individual switch cells 501, according to an implementation. Individual switch cells 501 include an optical splitter 500 configured to feed two optical phase shifters 502, which tune a phase of each arm using control signals 503 and 504. The electrical control of optical switch 506 can be in a push-pull fashion using two controls or it can be single-sided using a single control. The signals that pass through optical phase shifters 502 are recombined using an optical combiner 505, in an implementation. Based on operation of control signals 503 and 504, constructive or deconstructive interference occurs and causes light to be switched between the two outputs. Optical phase shifters 502 may be implemented as thermo-optic phase shifters and/or electro-optic phase shifters.

FIG. 5B illustrates an optical switch 520 that is implemented with an array of micro-ring resonators (MRR) 510, according to an implementation. Each MRR 510 picks up optical signals from a main bus waveguide 512 when the resonant frequency of the device is aligned with the laser wavelength. Electrical control signals (e.g., Ctrl 0, Ctrl 1, Ctrl 3, Ctrl M) can be used to set the resonances of each MRR 510 in the array and hence select an output port 511 through which the coherent optical signal (e.g., FMCW optical signal) is transmitted and received, according to an implementation.

FIG. 5C illustrates an optical switch 530 that is implemented with an array of micro-electromechanical system (MEMS) switches 515. Each MEMS switch 515 is configured to steer the optical signal from main bus waveguide 512 and therefore selects the output port (e.g., Out 1, Out 2, Out 3, Out M) through which the optical signal is transmitted and received, according to an implementation.

Figure 6:
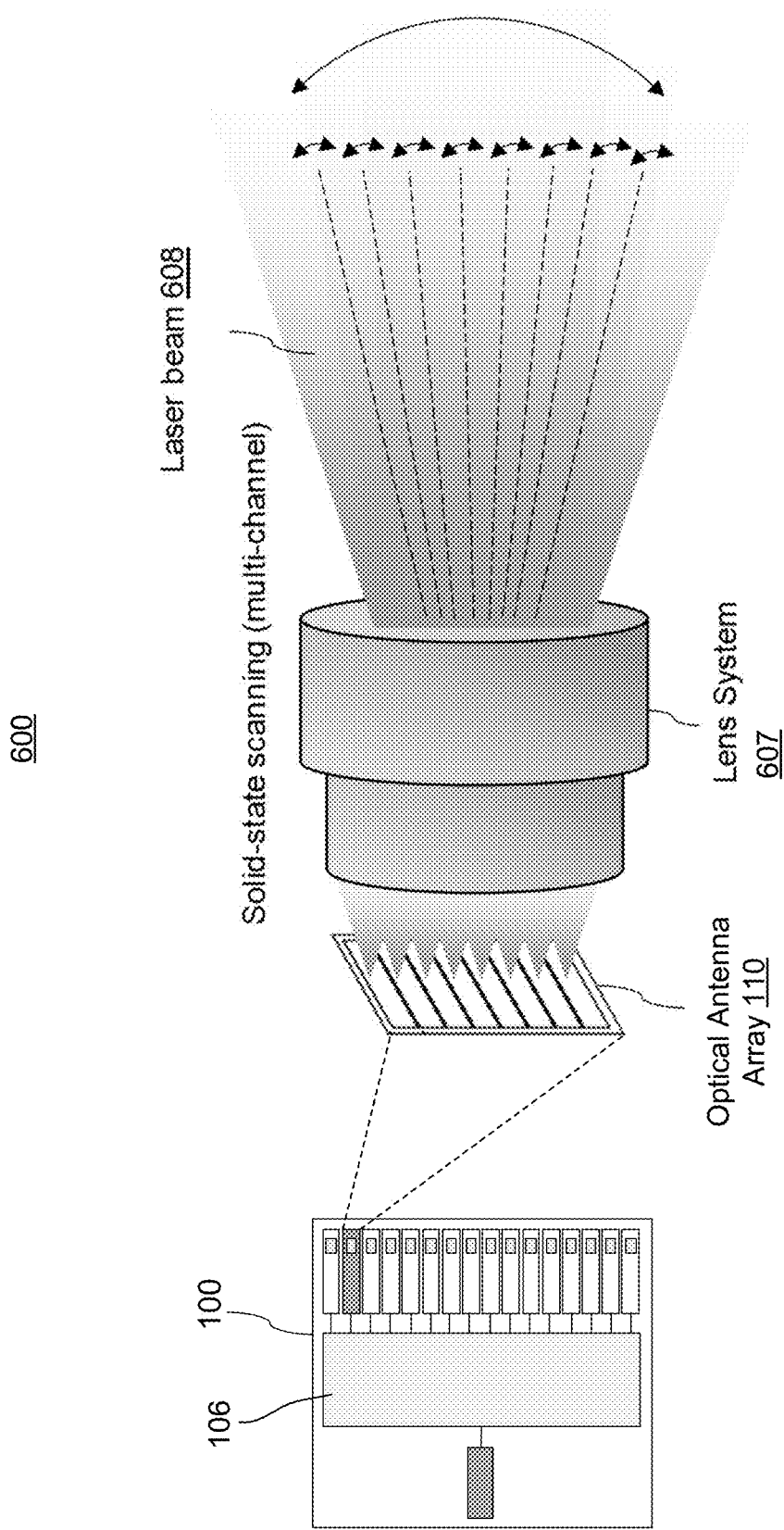
FIG. 6 illustrates a LIDAR system, in accordance with implementations of the disclosure.

FIG. 6 illustrates a LIDAR system 600 that incorporates LIDAR sensor 100 to form an addressable focal plane array, according to an implementation of the disclosure. Each one of optical antenna arrays 110 includes a number N of coherent pixels, which concurrently transmit an input signal when a particular one of optical antenna arrays 110 is selected. The transmission of the input signal, through lens system 607, from the coherent pixels becomes laser beam 608. Each one of optical antenna arrays 110 scans a portion of the field of view of lens system 607, which enables LIDAR system 600 to have a solid-state addressable field of view. When output of optical switch 106 selects a particular one of optical antenna arrays 110, each of the N coherent pixels simultaneously illuminates lens system 607, which collimates the incident light into N outgoing laser beams 608 that propagate at slightly different angles. Outgoing laser beams 608 propagate at slightly different angles based on the coherent pixel spacing in LIDAR sensor 100 and based on characteristics of lens system 607. As a result, each optical antenna array 110 illuminates a small portion of the full field of view of the focal plane array system.

Figure 7A:
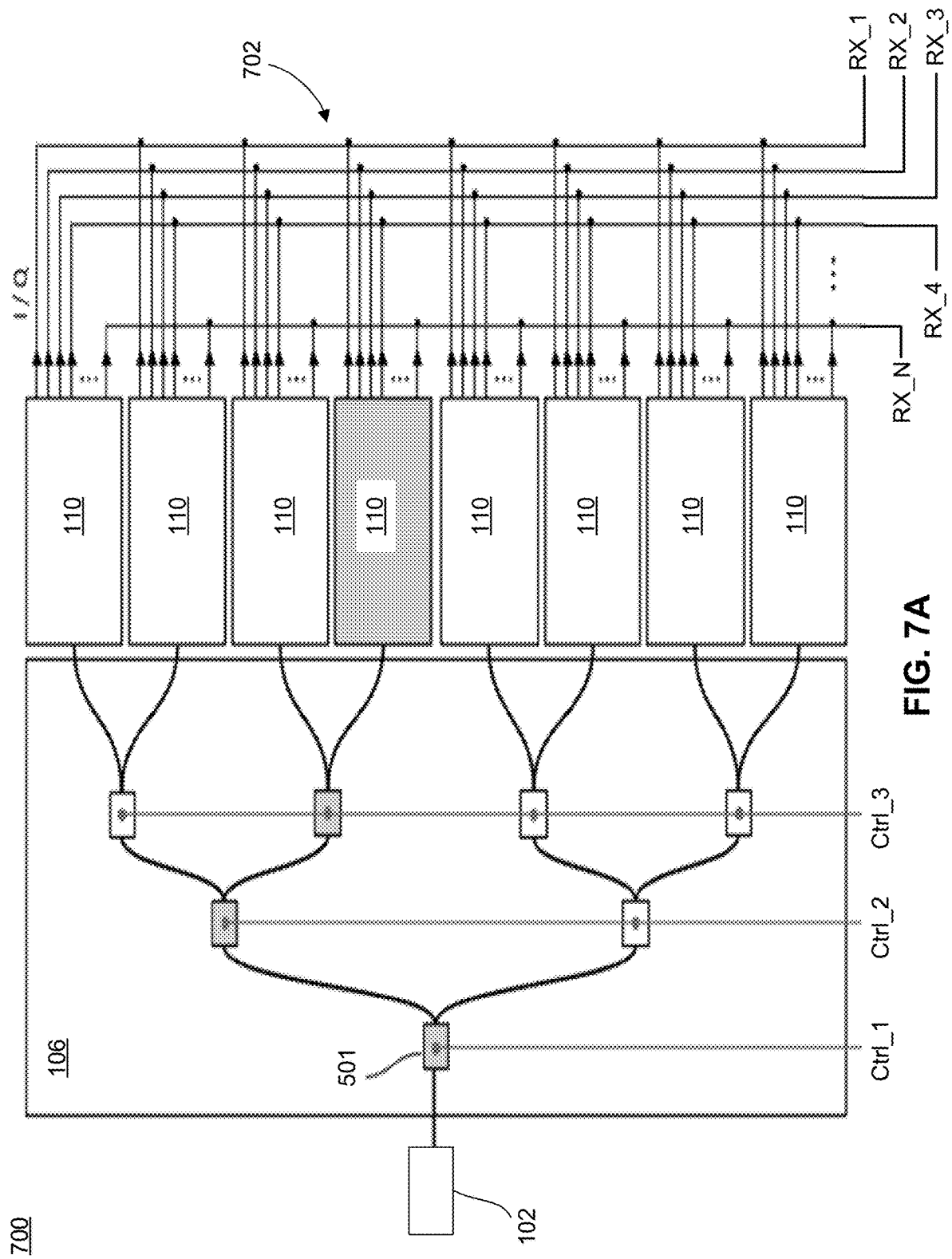
FIGS. 7A-7B illustrate electrical wiring schemes for routing output signals, in accordance with implementations of the disclosure.

FIG. 7A illustrates an electrical wiring scheme 700 for routing the in-phase (I) and quadrature (Q) signals out of optical antenna arrays 110, which each include a number N of coherent pixels, in accordance with implementations of the disclosure. In the illustrated example, every 8th coherent pixel is connected together on a bus 702, and 2*N buses in total are routed out of the switch (N for in-phase signals and N for quadrature signals). According to this wiring scheme, bus 702 (inclusive of channels RX_1, RX_2, RX_3, . . . RX_N) is used by one optical antenna array 110 at a time, as optical switch 106 only selects a particular one of optical antenna arrays 110 at a time, according to an implementation.

Figure 7B:
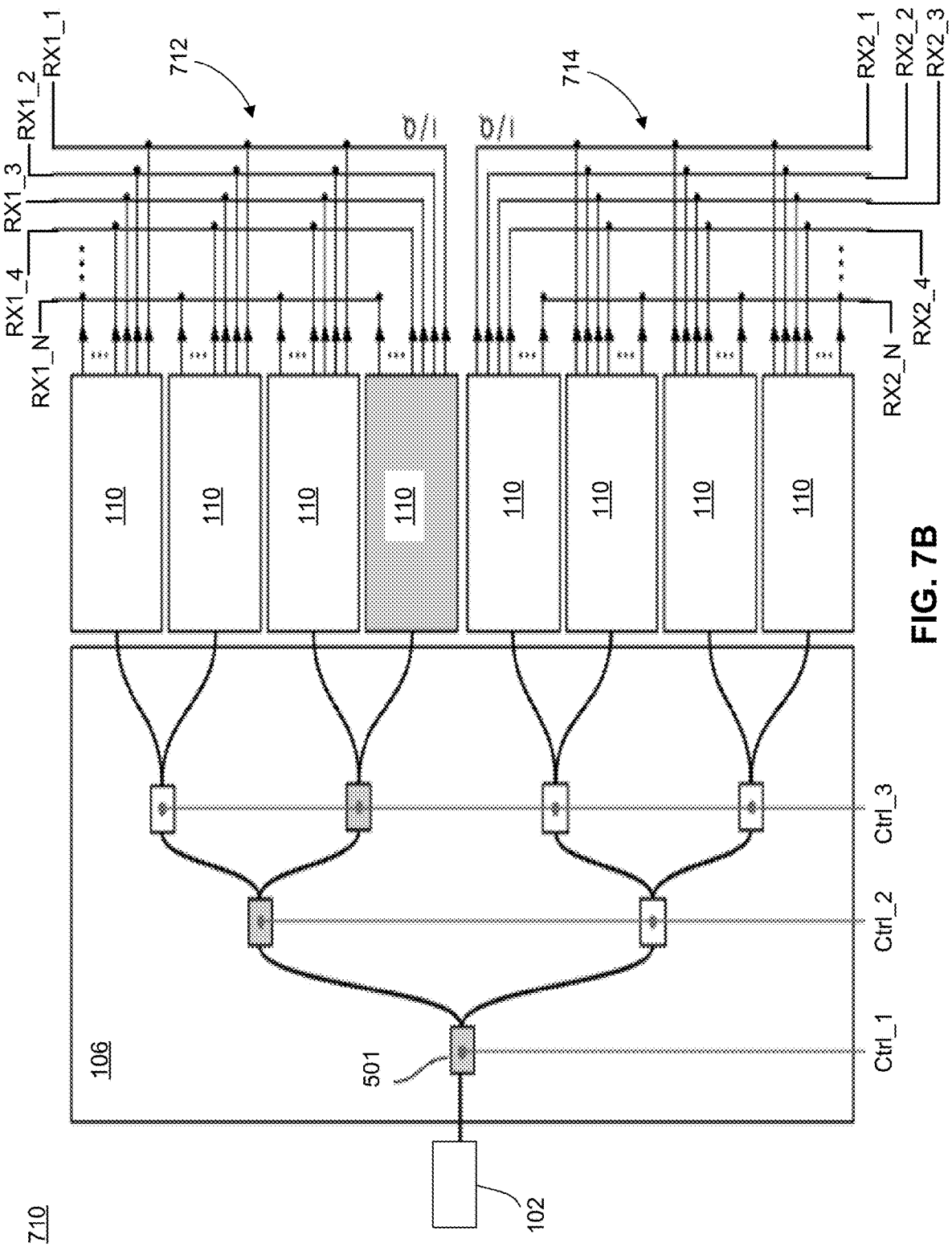

FIG. 7B illustrates an electrical wiring scheme 710 for routing the in-phase (I) and quadrature (Q) signals out of optical antenna arrays 110, which each include a number N of coherent pixels, in accordance with implementations of the disclosure. In the illustrated example, optical antenna arrays 110 are segmented into two (or more) smaller groups that are read out on bus 712 and bus 714. Bus 712 includes output channels RX1_1, RX1_2, RX1_3, . . . RX1_N, and bus 714 includes output channels RX2_1, RX2_2, RX2_3, . . . RX2_N. Every 8th coherent pixel within these smaller groups are then connected on a common bus (e.g., bus 712 or bus 714) and routed out of the array. In this example, if there are P subgroups of coherent pixels, then there are 2PN total signal buses leaving the optical antenna array. These 2PN buses can then be merged using, for example, an electrical switch to reduce the total amount of signal wires.

Figure 8:
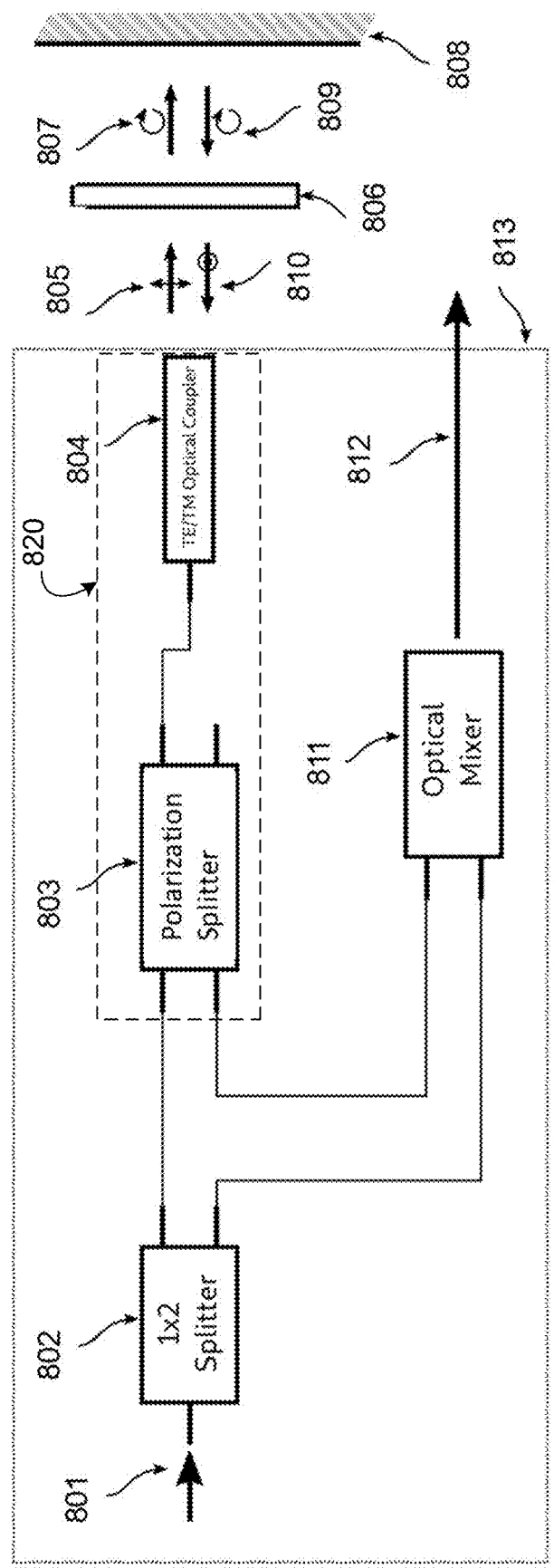
FIG. 8 illustrates a diagram of a coherent pixel, in accordance with implementations of the disclosure.

FIG. 8 illustrates a diagram a coherent pixel 813 that utilizes two polarizations of light to improve performance of a FMCW LIDAR system, according to one or more implementations of the disclosure. Input light 801 originating from a laser enters coherent pixel 813 and is split by an X/(1−X) splitter 802, also referred to as a splitter 802. X % of the light leaves the top port of splitter 802, which constitutes the TX signal, and (1−X) % of the light leaves the bottom port of splitter 802, which constitutes the local oscillator (LO) signal. The TX signal enters a polarization assembly 820. As illustrated, polarization assembly 820 includes a polarization splitter 803 and a polarization-insensitive free-space coupler 804. However, in other implementations, polarization splitter 803 and a polarization-insensitive free-space coupler 804 may be replaced with a single polarization-splitting vertical chip-to-free-space coupler. Polarization splitter 803, also referred to as a polarizer, separates transverse electric (TE) and transverse magnetic (TM) polarized light. Because the TX signal light is TE polarized, the light is coupled to a top port on the right-hand side of polarization splitter 803. Light that is TM polarized leaves through a bottom port on the right-hand side of polarization splitter 803. The TX signal leaving polarization splitter 803 enters a polarization-insensitive free-space coupler 804 which generates a free-space beam of light 805 that has a linear polarization matching the TE field of coherent pixel 813. Polarization-insensitive free-space coupler 804 is an example of an optical antenna. For example, the polarization-insensitive free-space coupler 804 could be a vertical grating, an edge coupler (e.g. inversely tapered waveguide), or an angled reflector.

Free-space beam of light 805 propagates through a quarter-wave plate 806 that converts the linearly polarized beam of light to a circularly polarized beam of light 807. The now-circularly-polarized light 807 propagates over a distance, which delays the light relative to the LO signal. This beam reflects off of a target surface 808, producing a (return signal) reflected beam of light 809. Depending on the surface properties, this reflected beam may maintain its circular polarization or its polarization may become randomized. Reflected beam of light 809 propagates back through free-space and through quarter-wave plate 806. If reflected beam of light 809 maintained its circular polarization, then transmitted beam 810 will have a TM polarization (with respect to the originating transmitting and receiving coherent pixel 813). If reflected beam 809 has a randomized polarization, then transmitted beam 810 will have a random polarization. Transmitted beam 810 is coupled back into coherent pixel 813 and propagates back into the top right-hand port of polarization splitter 803. If the received beam of light is TM polarized, all of the light will be coupled to the bottom-left port of polarization splitter 803. If the received beam is randomly polarized, then nominally half of the optical power will be coupled to the bottom-left port. Light coupled to the bottom-left port of polarization splitter 803 enters the two-input-power optical mixer 811, which mixes the delayed received signal with the LO signal. Optical mixer 811 generates one or more electrical signals 812 that are interpreted by the FMCW LIDAR system. Removing the quarter-wave plate may affect the system performance for polarization-maintaining target surfaces and does not affect the basic principle of this idea.

Polarization assembly 820 may be configured to form the transmitted signal; polarize the transmitted signal to have a first polarization; polarize the reflected signal (in-coupled via 804) based on a second polarization that is orthogonal to the first polarization to form a return signal; and couple the return signal into a second waveguide (e.g., going toward 811) for optical detection.

Coherent pixel 813 may be, for example, coherent pixel 118 (shown in FIG. 1). Coherent pixel 813 may also be an embodiment of the coherent pixels described above with reference to FIGS. 2A-2B. For example, optical splitter 202 may be replaced with X/(1−X) splitter 802 and polarization splitter 803, and optical antenna 200 may be replaced with the polarization-insensitive free-space coupler 804.

Figure 9:
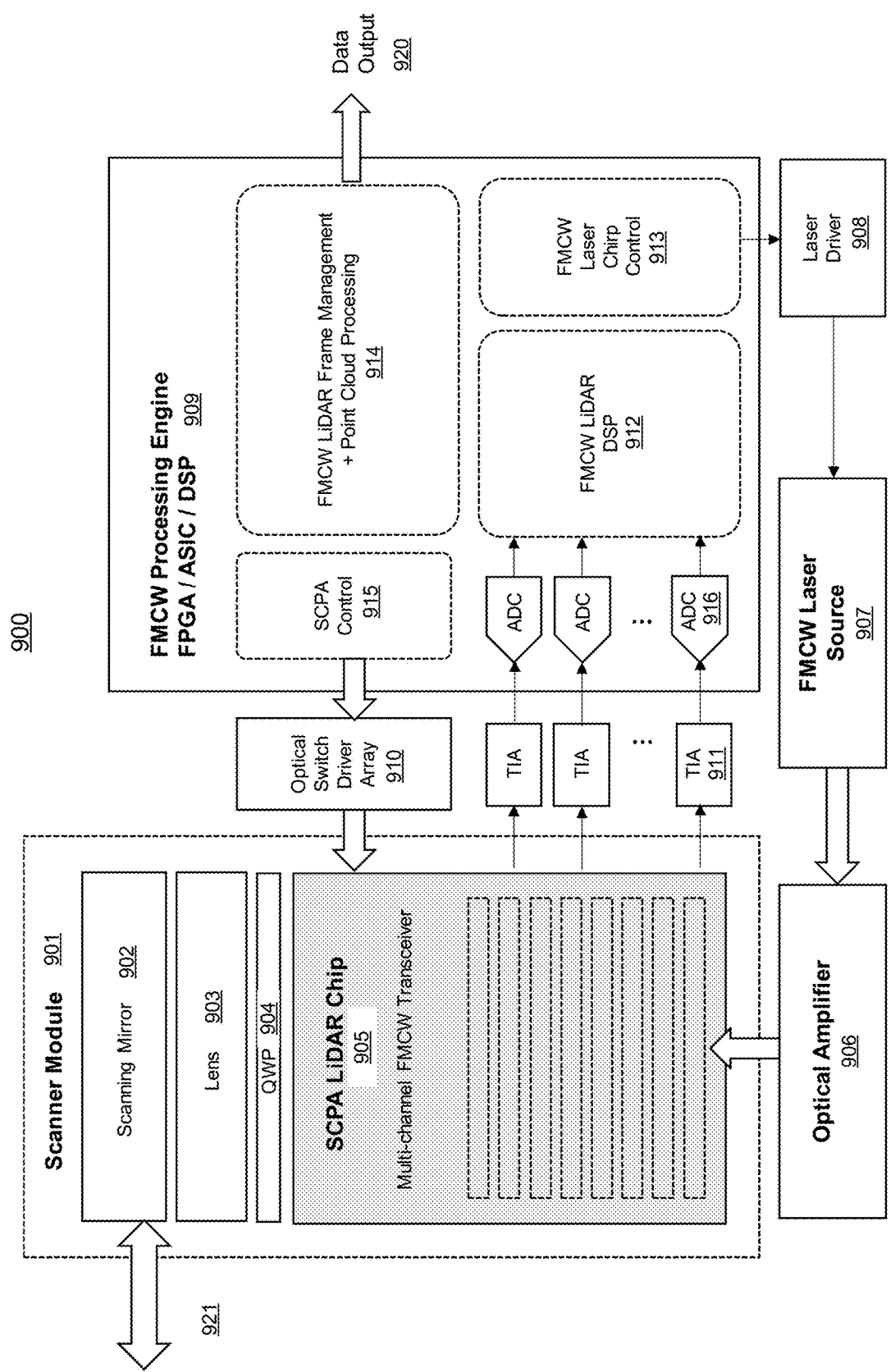
FIG. 9 illustrates a system diagram of a switchable coherent pixel array-based LIDAR system, in accordance with implementations of the disclosure.

FIG. 9 illustrates a system diagram of a switchable coherent pixel array (SCPA)-based FMCW LIDAR system 900, as a particular example of a coherent LIDAR system, according to one or more implementations of the disclosure. A scanner module 901 includes a SCPA LIDAR chip 905 with a single or a plurality of FMCW transceiver channels and a lens system 903 that includes one or more optical elements. In some embodiments, the lens system 903 is an embodiment of the lens system 607.

SCPA LIDAR chip 905 includes one or more frequency modulated continuous wave (FMCW) LIDAR transceivers (e.g., transceiver 104) that are implemented as one or more photonic integrated circuits. A photonic integrated circuit for a transceiver may comprise an input port, a plurality of optical antennas, an optical switch, a plurality of splitters, and a plurality of mixers.

The input port is configured to receive a frequency modulated laser signal. The optical switch is configured to switchably couple the input port to the optical antennas, thereby forming optical paths between the input port and the optical antennas. For each optical path from the input port to one of the optical antennas, a splitter coupled along the optical path and configured to: split a received portion of the laser signal into a local oscillator signal and a transmitted signal, wherein the transmitted signal is emitted via the optical antenna and a reflection of the transmitted signal is received via the optical antenna as a reflected signal; and output a return signal that is a portion of the reflected signal. For each splitter, a mixer coupled to receive the return signal and the local oscillator signal from the splitter, the mixer configured to mix the return signal and the local oscillator signal to generate one or more output signals used to determine depth information for a field of view of the LIDAR system (also referred to as the field of view of scanner module 901).

In some embodiments, lens system 903 produces collimated transmitted signals that scan scanner module 901 field of view along one or more angular dimension (e.g., azimuth or elevation). Scanner module 901 has a field of view of 5 degrees or better along the one angular dimension. And in embodiments with a two dimensional arrangement of the optical antennas (e.g., rectangular grid) signals from the plurality of optical antennas may be scanned in two dimensions within the field of view of scanner module 901. For example, scanning in a first dimension and a second dimension, and scanner module 901 field of view is at 5 degrees or better along the first dimension and is 5 degrees or better along the second dimension. Two-dimensional scanning in the above example may be performed by selective use of different coherent pixels.

Scanner module 901 may also include a scanning mirror 902 to assist laser beam scanning and/or a quarter-wave plate (QWP) 904 to improve polarization-dependent sensitivity. In embodiments that use the scanning mirror 902, scanner module 901 field of view is at 5 degrees or better along the first dimension (scanned via selective use of coherent pixels) and is 10 degrees or better along the second dimension (scanned at least in part via movement of scanning mirror 902). A light source for the LIDAR chip 905 can be integrated directly onto the same chip or coupled through fiber components. As shown, the light source can be a modulated laser source, a CW laser source, an FMCW laser source 907, or another coherent laser source that generates an input signal for coherent LIDAR operation. FMCW laser source 907 can be further amplified by an optical amplifier 906 to increase the range of the FMCW LIDAR. Optical amplifier 906 can be a semiconductor optical amplifier (SOA) chip or an Erbium-doped fiber amplifier (EDFA). FMCW laser source 907 is controlled by a laser driver circuit 908 which is typically a controllable low-noise current source. Outputs of the coherent pixels go to an array of transimpedance amplifier (TIA) circuits 911. The on-chip switches are controlled by switch driver arrays 910. FMCW processing engine 909 can be implemented with one or a plurality of FPGA, ASIC or DSP chips, which contains the following functionalities: SCPA control and calibration logic 915, FMCW LIDAR frame management and point cloud processing 914, multi-channel analog-to-digital convertors 916, FMCW LIDAR DSP 912, and FMCW laser chirp control and calibration logic 913. In case of implementing the SCPA LIDAR chip 905 with a CMOS silicon photonic platform, some or even all of the electrical circuit functionalities can be implemented monolithically with the photonic circuits on a single chip. The data output 920 of the FMCW processing engine includes depth information. Depth information may include, e.g., three dimensional position data of a typical LIDAR point cloud and other information that an FMCW LIDAR can measure such as velocity, reflectivity, etc.

FIG. 9 shows an example LIDAR system. In alternative configurations, different and/or additional components may be included in the LIDAR system. Additionally, functionality described in conjunction with one or more of the components shown in FIG. 9 may be distributed among the components in a different manner than described in conjunction with FIG. 9. For example, in some embodiments, SCPA LIDAR chip 905 may be separate from scanner module 901.

Figure 10A:
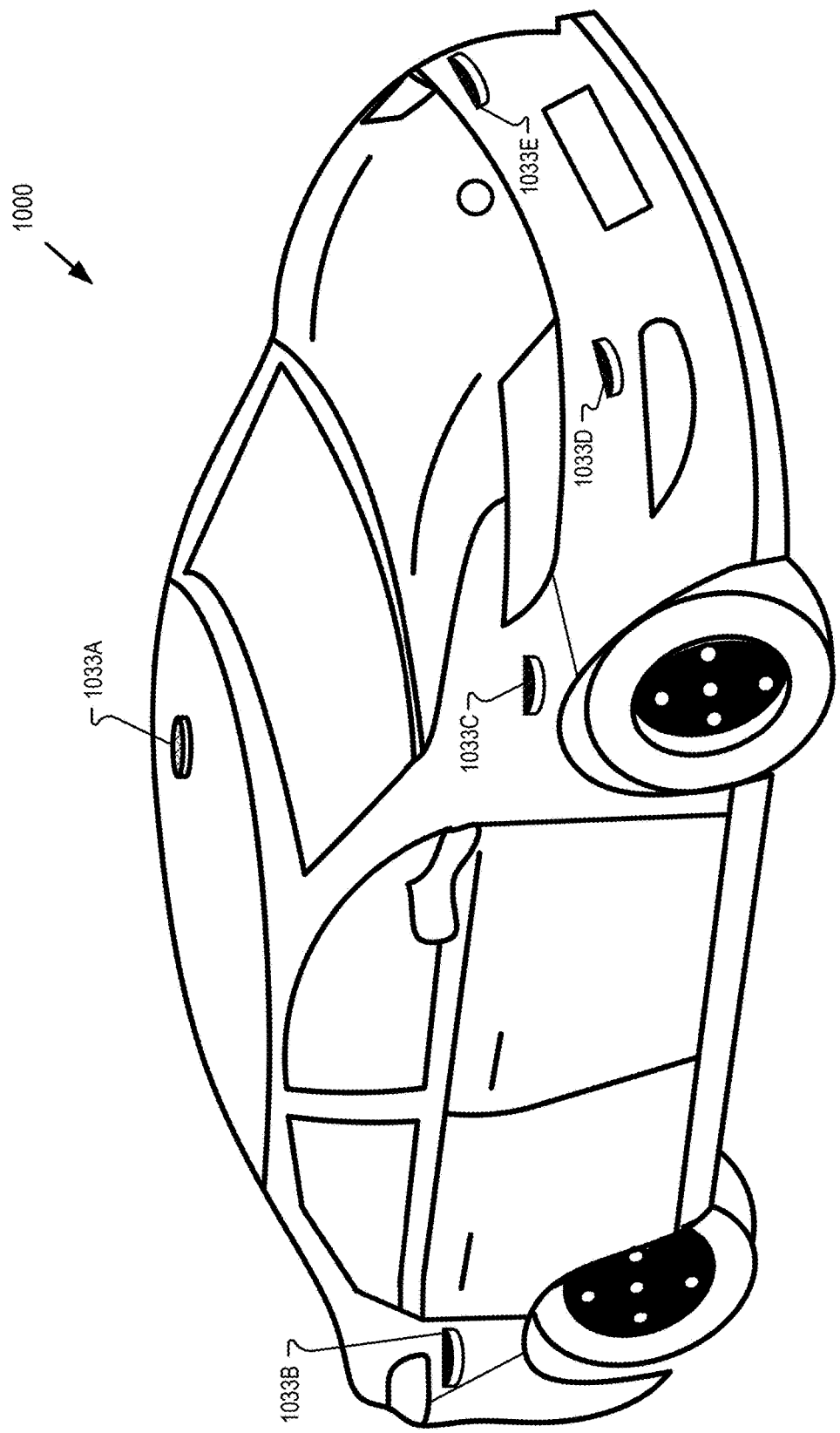
FIG. 10A illustrates an autonomous vehicle including an array of example sensors, in accordance with implementations of the disclosure.
Figure 10B:
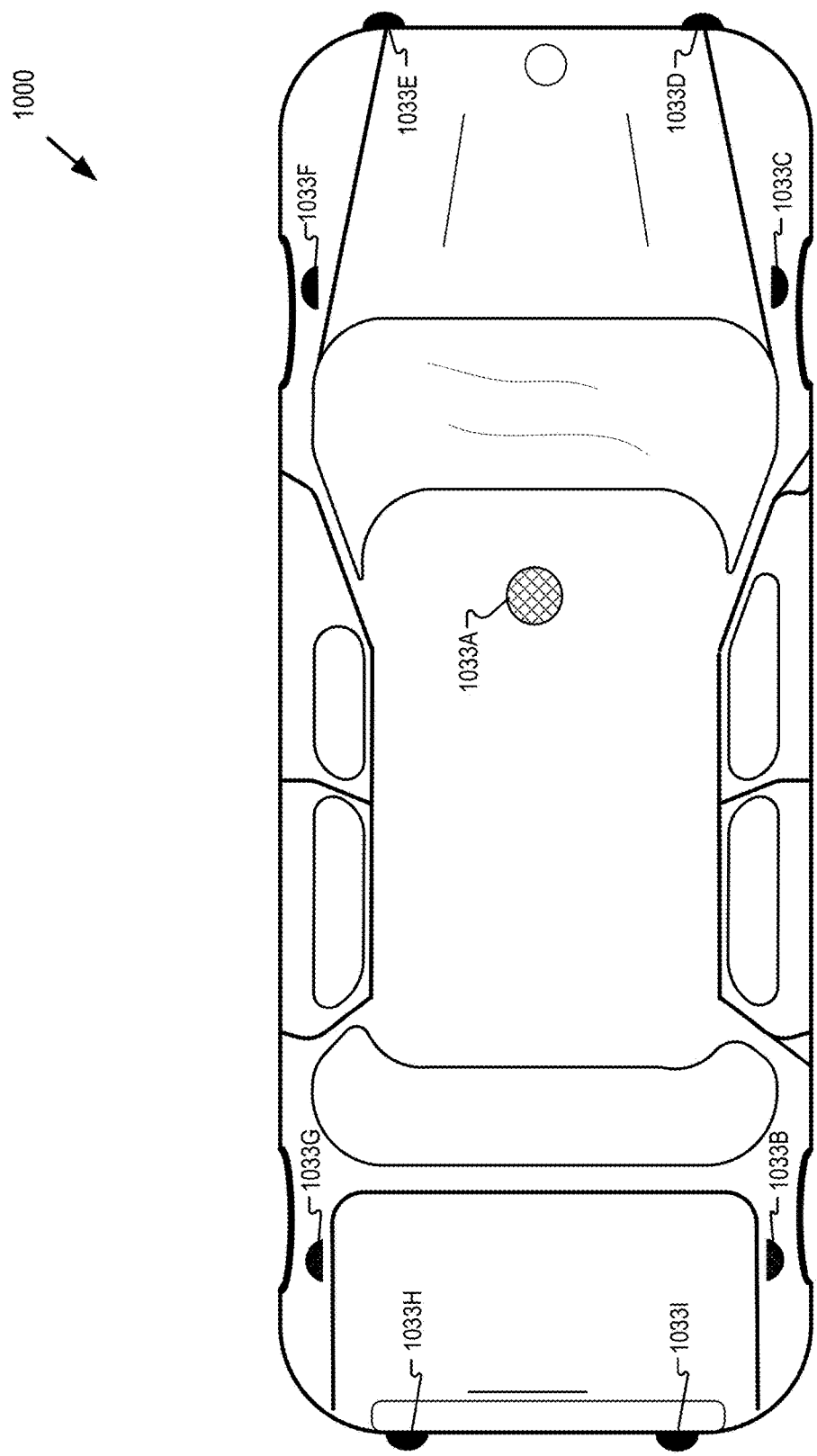
FIG. 10B illustrates a top view of an autonomous vehicle including an array of example sensors, in accordance with implementations of the disclosure.
Figure 10C:
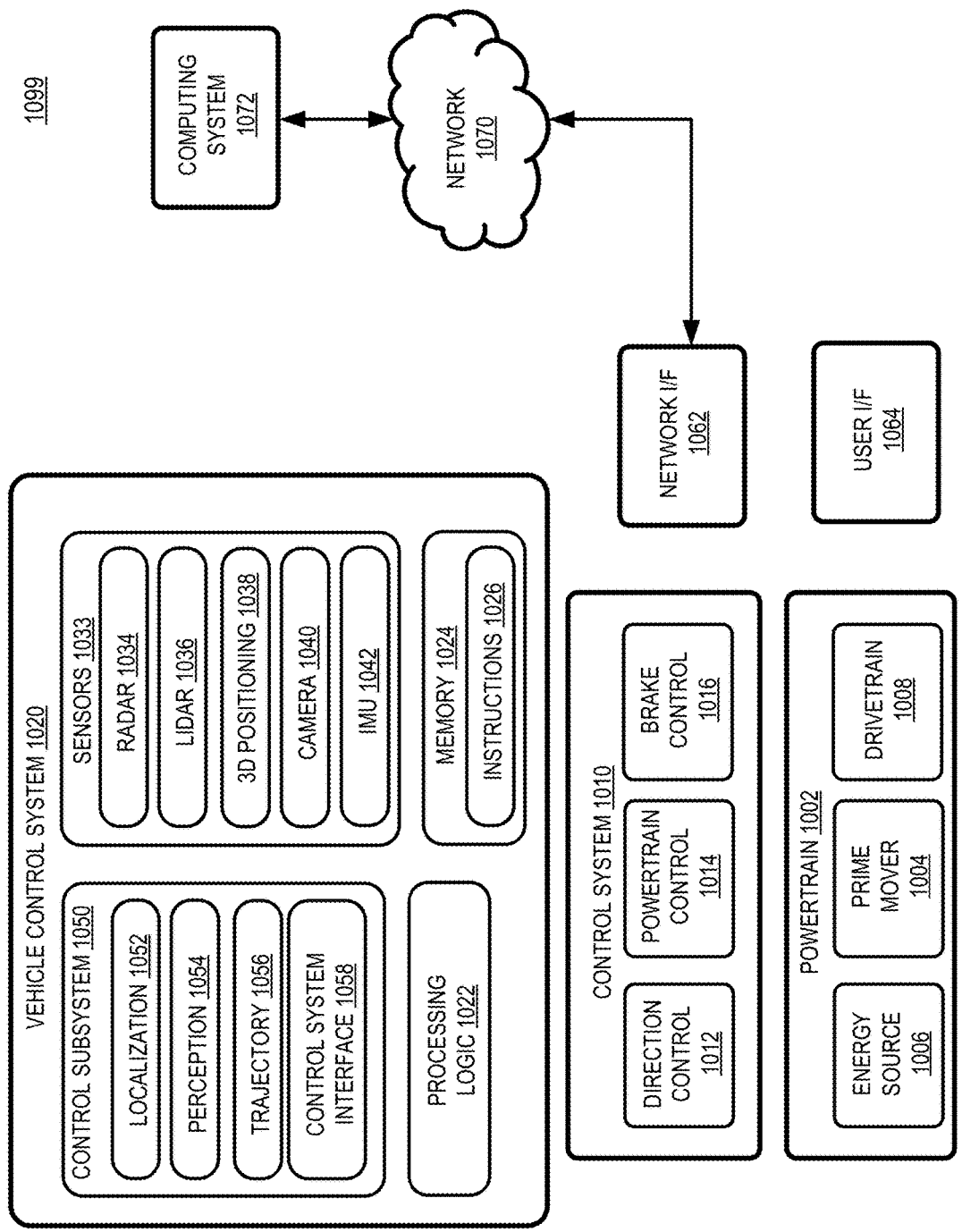
FIG. 10C illustrates an example vehicle control system including sensors, a drivetrain, and a control system, in accordance with implementations of the disclosure.

FIG. 10A illustrates an example autonomous vehicle 1000 that may include any of the LIDAR components of FIGS. 1-9 in a LIDAR device, in accordance with aspects of the disclosure. The illustrated autonomous vehicle 1000 includes an array of sensors configured to capture one or more objects of an external environment of the autonomous vehicle and to generate sensor data related to the captured one or more objects for purposes of controlling the operation of autonomous vehicle 1000. FIG. 10A shows sensor 1033A, 1033B, 1033C, 1033D, and 1033E. FIG. 10B illustrates a top view of autonomous vehicle 1000 including sensors 1033F, 1033G, 1033H, and 1033I in addition to sensors 1033A, 1033B, 1033C, 1033D, and 1033E. Any of sensors 1033A, 1033B, 1033C, 1033D, 1033E, 1033F, 1033G, 1033H, and/or 1033I may include LIDAR devices that include any of the LIDAR components of FIGS. 1-9. FIG. 10C illustrates a block diagram of an example system 1099 for autonomous vehicle 1000. For example, autonomous vehicle 1000 may include powertrain 1002 including prime mover 1004 powered by energy source 1006 and capable of providing power to drivetrain 1008. Autonomous vehicle 1000 may further include control system 1010 that includes direction control 1012, powertrain control 1014, and brake control 1016. Autonomous vehicle 1000 may be implemented as any number of different vehicles, including vehicles capable of transporting people and/or cargo and capable of traveling in a variety of different environments. It will be appreciated that the aforementioned components 1002-1016 can vary widely based upon the type of vehicle within which these components are utilized.

The implementations discussed hereinafter, for example, will focus on a wheeled land vehicle such as a car, van, truck, or bus. In such implementations, prime mover 1004 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 1008 may include wheels and/or tires along with a transmission and/or any other mechanical drive components suitable for converting the output of prime mover 1004 into vehicular motion, as well as one or more brakes configured to controllably stop or slow the autonomous vehicle 1000 and direction or steering components suitable for controlling the trajectory of the autonomous vehicle 1000 (e.g., a rack and pinion steering linkage enabling one or more wheels of autonomous vehicle 1000 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 1012 may include one or more actuators and/or sensors for controlling and receiving feedback from the direction or steering components to enable the autonomous vehicle 1000 to follow a desired trajectory. Powertrain control 1014 may be configured to control the output of powertrain 1002, e.g., to control the output power of prime mover 1004, to control a gear of a transmission in drivetrain 1008, thereby controlling a speed and/or direction of the autonomous vehicle 1000. Brake control 1016 may be configured to control one or more brakes that slow or stop autonomous vehicle 1000, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 1000 is implemented in vehicle control system 1020, which may include one or more processors in processing logic 1022 and one or more memories 1024, with processing logic 1022 configured to execute program code (e.g., instructions 1026) stored in memory 1024. Processing logic 1022 may include graphics processing unit(s) (GPUs) and/or central processing unit(s) (CPUs), for example. Vehicle control system 1020 may be configured to control powertrain 1002 of autonomous vehicle 1000 in response to the infrared returning beams that are a reflection of an infrared transmit beam that propagated through waveguide(s) into an external environment of autonomous vehicle 1000 and reflected back to a receive LIDAR pixel.

Sensors 1033A-1033I may include various sensors suitable for collecting data from an autonomous vehicle's surrounding environment for use in controlling the operation of the autonomous vehicle. For example, sensors 1033A-1033I can include RADAR unit 1034, LIDAR unit 1036, 3D positioning sensor(s) 1038, e.g., a satellite navigation system such as GPS, GLONASS, BeiDou, Galileo, or Compass. The LIDAR components of FIGS. 1-9 may be included in interferometers, modulators, and/or resonators in LIDAR unit 1036. LIDAR unit 1036 may include a plurality of LIDAR sensors that are distributed around autonomous vehicle 1000, for example. In some implementations, 3D positioning sensor(s) 1038 can determine the location of the vehicle on the Earth using satellite signals. Sensors 1033A-1033I can optionally include one or more ultrasonic sensors, one or more cameras 1040, and/or an Inertial Measurement Unit (IMU) 1042. In some implementations, camera 1040 can be a monographic or stereographic camera and can record still and/or video images. Camera 1040 may include a Complementary Metal-Oxide-Semiconductor (CMOS) image sensor configured to capture images of one or more objects in an external environment of autonomous vehicle 1000. IMU 1042 can include multiple gyroscopes and accelerometers capable of detecting linear and rotational motion of autonomous vehicle 1000 in three directions. One or more encoders (not illustrated) such as wheel encoders may be used to monitor the rotation of one or more wheels of autonomous vehicle 1000.

The outputs of sensors 1033A-1033I may be provided to control subsystems 1050, including, localization subsystem 1052, trajectory subsystem 1056, perception subsystem 1054, and control system interface 1058. Localization subsystem 1052 is configured to determine the location and orientation (also sometimes referred to as the "pose") of autonomous vehicle 1000 within its surrounding environment, and generally within a particular geographic area. The location of an autonomous vehicle can be compared with the location of an additional vehicle in the same environment as part of generating labeled autonomous vehicle data. Perception subsystem 1054 may be configured to detect, track, classify, and/or determine objects within the environment surrounding autonomous vehicle 1000. Trajectory subsystem 1056 is configured to generate a trajectory for autonomous vehicle 1000 over a particular timeframe given a desired destination as well as the static and moving objects within the environment. A machine learning model in accordance with several implementations can be utilized in generating a vehicle trajectory. Control system interface 1058 is configured to communicate with control system 1010 in order to implement the trajectory of the autonomous vehicle 1000. In some implementations, a machine learning model can be utilized to control an autonomous vehicle to implement the planned trajectory.

It will be appreciated that the collection of components illustrated in FIG. 10C for vehicle control system 1020 is merely exemplary in nature. Individual sensors may be omitted in some implementations. In some implementations, different types of sensors illustrated in FIG. 10C may be used for redundancy and/or for covering different regions in an environment surrounding an autonomous vehicle. In some implementations, different types and/or combinations of control subsystems may be used. Further, while subsystems 1052-1058 are illustrated as being separate from processing logic 1022 and memory 1024, it will be appreciated that in some implementations, some or all of the functionality of subsystems 1052-1058 may be implemented with program code such as instructions 1026 resident in memory 1024 and executed by processing logic 1022, and that these subsystems 1052-1058 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 1020 may be networked in various manners.

In some implementations, different architectures, including various combinations of software, hardware, circuit logic, sensors, and networks may be used to implement the various components illustrated in FIG. 10C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 1000, e.g., any cache memory in a processor, as well as any storage capacity used as a virtual memory, e.g., as stored on a mass storage device or another computer controller. Processing logic 1022 illustrated in FIG. 10C, or entirely separate processing logic, may be used to implement additional functionality in autonomous vehicle 1000 outside of the purposes of autonomous control, e.g., to control entertainment systems, to operate doors, lights, or convenience features.

In addition, for additional storage, autonomous vehicle 1000 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 1000 may include a user interface 1064 to enable autonomous vehicle 1000 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 1000 may include one or more network interfaces, e.g., network interface 1062, suitable for communicating with one or more networks 1070 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 1000 receives environmental and other data for use in autonomous control thereof. In some implementations, data collected by one or more sensors 1033A-1033I can be uploaded to computing system 1072 through network 1070 for additional processing. In such implementations, a time stamp can be associated with each instance of vehicle data prior to uploading.

Processing logic 1022 illustrated in FIG. 10C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 1000 through network 1070, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 10C is not intended to limit implementations disclosed herein. Indeed, those skilled in the art will recognize that other alternative hardware and/or software environments may be used without departing from the scope of implementations disclosed herein.

In implementations of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A light detection and ranging (LIDAR) sensor system comprising:
a first optical splitter configured to receive an input signal, wherein the first optical splitter is configured to split the input signal into a transmit signal and a local oscillator signal;
a transceiver coupled to the first optical splitter and configured to receive the transmit signal from the first optical splitter, wherein the transceiver includes:
a plurality of optical antenna arrays, wherein each of at least three of the plurality of optical antenna arrays respectively include:
a particular number of optical antennas; and
a second optical splitter coupled to the particular number of optical antennas and configured to individually provide the transmit signal to each of the particular number of optical antennas, wherein the second optical splitter comprises a plurality of passive optical splitters configured to evenly distribute the transmit signal to a particular number of communication channels corresponding to the particular number of optical antennas, wherein at least one of the plurality of optical antenna arrays includes an optical pixel, wherein the optical pixel includes:
at least one of the particular number of optical antennas; and
an optical combiner coupled to the at least one of the particular number of optical antennas to receive a return signal, wherein the optical combiner is configured to combine the return signal with the local oscillator signal; and
an optical switch coupled to the plurality of optical antenna arrays, wherein the optical switch is configured to selectively provide the transmit signal to the at least one of the plurality of optical antenna arrays; and
a local oscillator network coupled to the first optical splitter and configured to receive the local oscillator signal from the first optical splitter, wherein the local oscillator network is configured to selectively split the local oscillator signal into a plurality of local oscillator signals for the plurality of optical antenna arrays.

2. The LIDAR sensor system of claim 1, wherein the input signal is a modulated laser signal, wherein the optical switch includes:
an active optical splitter that selectively couples the modulated laser signal to only one of the plurality of optical antenna arrays.

3. The LIDAR sensor system of claim 1, wherein the input signal is a frequency modulated continuous wave (FMCW) laser signal, wherein the optical switch includes:
an active optical splitter that selectively couples the FMCW laser signal to only one of the plurality of optical antenna arrays.

4. The LIDAR sensor system of claim 1, wherein the optical switch is configured to optically couple the transmit signal to at least one of the plurality of optical antenna arrays one-at-a-time over a scanning period of the transceiver to illuminate one or more particular portions of a scene in a field of view of the LIDAR sensor system.

5. The LIDAR sensor system of claim 1, wherein the second optical splitter includes a plurality of passive optical splitters coupled in parallel to each of the particular number of optical antennas in a selected one of the plurality of optical antenna arrays, wherein the plurality of passive optical splitters is configured to concurrently provide the transmit signal to the particular number of optical antennas in the selected one of the plurality of optical antenna arrays.

6. The LIDAR sensor system of claim 1, wherein the second optical splitter is configured to enable concurrent transmission of the transmit signal from the particular number of optical antennas.

7. The LIDAR sensor system of claim 1, wherein the particular number of optical antennas are arranged in a one-dimensional pattern or in a two-dimensional pattern.

8. The LIDAR sensor system of claim 1, wherein the optical combiner is configured to provide a combined output signal, and wherein the optical pixel further includes a plurality of photo diodes configured to convert the combined output signal into electrical signals representative of a LIDAR beat tone.

9. The LIDAR sensor system of claim 1, wherein the optical switch is a first optical switch, wherein the local oscillator network comprises:
a plurality of optical splitters configured to provide the plurality of local oscillator signals to the plurality of optical antenna arrays; and
a second optical switch coupled to the plurality of optical splitters and configured to selectively provide a portion of the local oscillator signal to at least one of the plurality of optical splitters.

10. The LIDAR sensor system of claim 9, wherein at least one of the plurality of optical splitters includes a plurality of passive optical splitters configured to split a portion of the local oscillator signal between the particular number of optical antennas in a selected one of the plurality of optical antenna arrays.

11. The LIDAR sensor system of claim 9, wherein each one of the plurality of optical splitters is coupled to a corresponding one of the plurality of optical antenna arrays to provide the local oscillator signal.

12. The LIDAR sensor system of claim 1, wherein the at least three of the plurality of optical antenna arrays include an output signal bus, wherein the particular number of optical antennas of a first of the plurality of optical antenna arrays shares the output signal bus with a second of the plurality of optical antenna arrays.

13. The LIDAR sensor system of claim 12, wherein the output signal bus includes electrical signal lines for an in-phase signal and a quadrature signal from each of the particular number of optical antennas.

14. The LIDAR sensor system of claim 1, wherein the optical switch includes at least one of: a binary tree switch, an array of micro-ring resonators, and an array of micro-electromechanical system (MEMS) switches.

15. A light detection and ranging (LIDAR) sensor chip comprising:
a light source that is configured to generate an input signal;
a first optical splitter configured to receive the input signal, wherein the first optical splitter is configured to split the input signal into a transmit signal and a local oscillator signal;
a transceiver coupled to the first optical splitter to receive the transmit signal, wherein the transceiver includes:
a plurality of optical antenna arrays, wherein each of at least three of the plurality of optical antenna arrays respectively include:
a particular number of optical antennas; and
a second optical splitter coupled to the particular number of optical antennas, wherein the second optical splitter comprises a plurality of passive optical splitters configured to evenly distribute the transmit signal to a particular number of communication channels corresponding to the particular number of optical antennas,
wherein at least one of the plurality of optical antenna arrays includes an optical pixel, wherein the optical pixel includes:
at least one of the particular number of optical antennas; and
an optical combiner coupled to the at least one of the particular number of optical antennas to receive a return signal, wherein the optical combiner is configured to combine the return signal with the local oscillator signal; and
an optical switch coupled to the plurality of optical antenna arrays, wherein the optical switch is configured to selectively provide the transmit signal to the at least one of the plurality of optical antenna arrays; and a local oscillator network coupled to the first optical splitter and configured to receive the local oscillator signal from the first optical splitter, wherein the local oscillator network is configured to selectively split the local oscillator signal into a plurality of local oscillator signals for the plurality of optical antenna arrays.

16. The LIDAR sensor chip of claim 15 further including a lens, wherein the transceiver is optically coupled to the lens to scan blocks of a field of view of the lens.

17. The LIDAR sensor chip of claim 15 further including:
a processing engine configured to receive LIDAR return signals from the transceiver and configured to generate frames of LIDAR data based on the LIDAR return signals.

18. An autonomous vehicle comprising:
a light detection and ranging (LIDAR) sensor that includes:
  a light source that is configured to generate an input signal;
  a first optical splitter configured to receive the input signal, wherein the first optical splitter is configured to split the input signal into a transmit signal and a local oscillator signal;
  a transceiver coupled to the first optical splitter to receive the transmit signal, wherein the transceiver includes:
    a plurality of optical antenna arrays, wherein each of at least three of the plurality of optical antenna arrays respectively include:
    a particular number of optical antennas; and
    a second optical splitter coupled to the particular number of optical antennas, wherein the second optical splitter comprises a plurality of passive optical splitters configured to evenly distribute the transmit signal to a particular number of communication channels corresponding to the particular number of optical antennas,
    wherein at least one of the plurality of optical antenna arrays includes an optical pixel, wherein the optical pixel includes:
      at least one of the particular number of optical antennas; and
      an optical combiner coupled to the at least one of the particular number of optical antennas to receive a return signal, wherein the optical combiner is configured to combine the return signal with the local oscillator signal; and
    an optical switch coupled to the plurality of optical antenna arrays, wherein the optical switch is configured to selectively provide the transmit signal to at least one of the plurality of optical antenna arrays; and
  a local oscillator network coupled to the first optical splitter and configured to receive the local oscillator signal from the first optical splitter, wherein the local oscillator network is configured to selectively split the local oscillator signal into a plurality of local oscillator signals for the plurality of optical antenna arrays.

19. The autonomous vehicle of claim 18 further including a lens, wherein the transceiver is optically coupled to the lens to provide horizon scanning of blocks of an operational environment of the autonomous vehicle.

20. The autonomous vehicle of claim 18 further including:
a processing engine configured to receive LIDAR return signals from the transceiver and configured to generate a point cloud representation of an operational environment of the autonomous vehicle at least partially based on the LIDAR return signals.

* * * * *